(12) United States Patent
Ambauen et al.

(10) Patent No.: US 11,176,770 B2
(45) Date of Patent: Nov. 16, 2021

(54) REAL-TIME PROCESSING AND MANAGING OF PRODUCT ORDERS

(71) Applicant: KEENWAWA, INC., San Francisco, CA (US)

(72) Inventors: Matthew J Ambauen, San Francisco, CA (US); May Kay Cheung, Pleasanton, CA (US); Jacob Riddley Felser, San Francisco, CA (US); Marina Isabel Fernandez Rodriguez, Burlingame, CA (US); Ryan Wertz Fletcher, San Francisco, CA (US); Jason Fruy, Oakland, CA (US); Seth Heltsley, San Francisco, CA (US); Aaron Michael Kolysko, Vallejo, CA (US); Justin Scott Laughland, San Francisco, CA (US); Nora Naranjo, San Francisco, CA (US); Corrine Savaiano, San Francisco, CA (US); Mark Edward Fleschler, San Francisco, CA (US); Michael Terry Brust, Oakland, CA (US); Sara Katherine Vredevoogd, San Francisco, CA (US); Gregory Donald Giacovelli, Jr., San Francisco, CA (US); Ana Maria Varela, San Francisco, CA (US); Jeffrey Todd Spitulnik, Orinda, CA (US); Thien Hua Truong, Los Gatos, CA (US)

(73) Assignee: KEENWAWA, INC., San Francisco, CA (US)

(*) Notice: Subject to any disclaimer, the term of this patent is extended or adjusted under 35 U.S.C. 154(b) by 195 days.

(21) Appl. No.: 16/368,232

(22) Filed: Mar. 28, 2019

(65) Prior Publication Data

US 2019/0304238 A1     Oct. 3, 2019

Related U.S. Application Data

(60) Provisional application No. 62/649,487, filed on Mar. 28, 2018, provisional application No. 62/683,767, (Continued)

(51) Int. Cl.
*G07F 17/00*     (2006.01)
*G07F 7/02*     (2006.01)
(Continued)

(52) U.S. Cl.
CPC ..... *G07F 17/0064* (2013.01); *G06Q 30/0621* (2013.01); *G06Q 30/0635* (2013.01);
(Continued)

(58) Field of Classification Search
CPC combination set(s) only.
See application file for complete search history.

(56) References Cited

U.S. PATENT DOCUMENTS

| 6,466,368 B1 | 10/2002 | Piepel et al. |
| 2002/0035515 A1 | 3/2002 | Moreno |

(Continued)

FOREIGN PATENT DOCUMENTS

| EP | 1 793 326 A2 | 6/2007 |
| JP | 2004086585 A | 3/2004 |

(Continued)

OTHER PUBLICATIONS

Office Action in Japanese Patent Application. No. 2018-530678, dated Feb. 5, 2020, 1 page.
(Continued)

*Primary Examiner* — Kyle O Logan
(74) *Attorney, Agent, or Firm* — Baker Botts L.L.P.

(57) ABSTRACT

An intelligent shelf comprising: a top platform; an electronics module including: one or more sensors for sensing
(Continued)

presence of content on the top platform; a wireless communication chip for enabling data communication over a network; a display screen for displaying dynamic messages based on the data communication and the sensing.

24 Claims, 21 Drawing Sheets

Related U.S. Application Data filed on Jun. 12, 2018, provisional application No. 62/693,551, filed on Jul. 3, 2018, provisional application No. 62/718,500, filed on Aug. 14, 2018, provisional application No. 62/784,225, filed on Dec. 21, 2018.

(51) Int. Cl.
  *G06Q 30/06* (2012.01)
  *G07F 9/02* (2006.01)
  *G07F 9/00* (2006.01)

(52) U.S. Cl.
  CPC .............. *G07F 7/025* (2013.01); *G07F 9/006* (2013.01); *G07F 9/023* (2013.01)

(56) References Cited

U.S. PATENT DOCUMENTS

| | | |
|---|---|---|
| 2006/0218040 A1 | 9/2006 | Sabapathypillai |
| 2007/0109764 A1 | 5/2007 | Bienick |
| 2008/0046345 A1* | 2/2008 | Serre .................... G06Q 30/06 705/28 |
| 2008/0052200 A1 | 2/2008 | Bodin et al. |
| 2009/0132492 A1 | 5/2009 | Satoh |
| 2010/0219958 A1 | 9/2010 | Caldwell et al. |
| 2011/0208617 A1 | 8/2011 | Weiland |
| 2012/0285089 A1 | 11/2012 | Arthwohl et al. |
| 2013/0130208 A1 | 5/2013 | Riscalla |
| 2013/0211583 A1 | 8/2013 | Borra |
| 2013/0275236 A1 | 10/2013 | Koke |
| 2013/0284806 A1 | 10/2013 | Margalit |
| 2014/0006205 A1 | 1/2014 | Berry |
| 2014/0078407 A1 | 3/2014 | Green et al. |
| 2014/0089077 A1 | 3/2014 | Zuckerman et al. |
| 2014/0311173 A1 | 10/2014 | Nilles et al. |
| 2014/0351068 A1 | 11/2014 | Renfroe |
| 2015/0042746 A1 | 2/2015 | Lewis et al. |
| 2015/0356664 A1* | 12/2015 | Mackler ............. G06Q 30/0635 705/26.81 |
| 2016/0042315 A1 | 2/2016 | Field-Darragh et al. |
| 2016/0058181 A1 | 3/2016 | Han et al. |
| 2016/0134930 A1* | 5/2016 | Swafford .............. A47F 5/0068 725/80 |
| 2016/0252390 A1* | 9/2016 | Batsikouras ........... G01G 19/52 177/25.13 |
| 2017/0109115 A1* | 4/2017 | Fan ....................... G06F 1/1639 |
| 2017/0228686 A1 | 8/2017 | Bermudez Rodriguez et al. |

FOREIGN PATENT DOCUMENTS

| | | |
|---|---|---|
| JP | 2005502112 A | 1/2005 |
| JP | 2007213222 A | 8/2007 |

OTHER PUBLICATIONS

Claims in Japanese Patent Application. No. 2018-530678, dated Feb. 2020, 5 pages.
Young, U.S. Appl. No. 16/653,620, filed Oct. 15, 2019, Office Action, dated Dec. 11, 2019.
The International Bureau of WIPO, "International Preliminary Report on Patentability", in application No. PCT/US2016/053132, dated Feb. 27, 2018, 9.
International Searching Authority, "Search Report" in application No. PCT/US16/53132, dated Dec. 23, 2016, 15 pages.
Current Claims in application No. PCT/US2016/053132, dated Feb. 2018, 5 pages.
Current Claims in application No. PCT/US2016/053132, dated Dec. 2016, 5 pages.
Mueller, U.S. Appl. No. 15/247,511, filed Aug. 25, 2016, Interview Summary, dated Jul. 9, 2019.
Mueller, U.S. Appl. No. 15/247,511, filed Aug. 25, 2016, Notice of Allowance, dated Aug. 16, 2019.
Japanese Patent Office, "Notice of Grounds for Rejection", in application No. 2018-530678, dated Feb. 5, 2020, 4 pages.
Japanese Claims in application No. 2018-530678, dated Feb. 2020, 5 pages.
The International Searching Authority, "Search Report and Written Opinion" in application No. PCT/US19/24641, dated Jun. 18, 2019, 13 pages.
European Patent Office, "Search Report" in application No. 16840267.5-1217, dated Apr. 30, 2019, 11 pages.
European Claims in application No. 16840267.5-1217, dated Apr. 2019, 1 page.
Current Claims in application No. PCT/US 19/24641, dated Jun. 2019, 4 pages.
European Patent Office, "Search Report" in appication No. 16 840 267.5-1213, dated May 12, 2020, 8 pages.
European Claims in application No. 16 840 267.5-1213, dated May 2020, 3 pages.
Australian Patent Office, "Examination Report No. 1", in application No. 2016311505, dated Apr. 6, 2020, 5 pages.
Australian Claims in application No. 2016311505, dated Apr. 2020, 5 pages.
EESR received from EPO for EP Patent Application No. 19774808.0-1213, Mar. 5, 2021.

\* cited by examiner

FIG. 3M
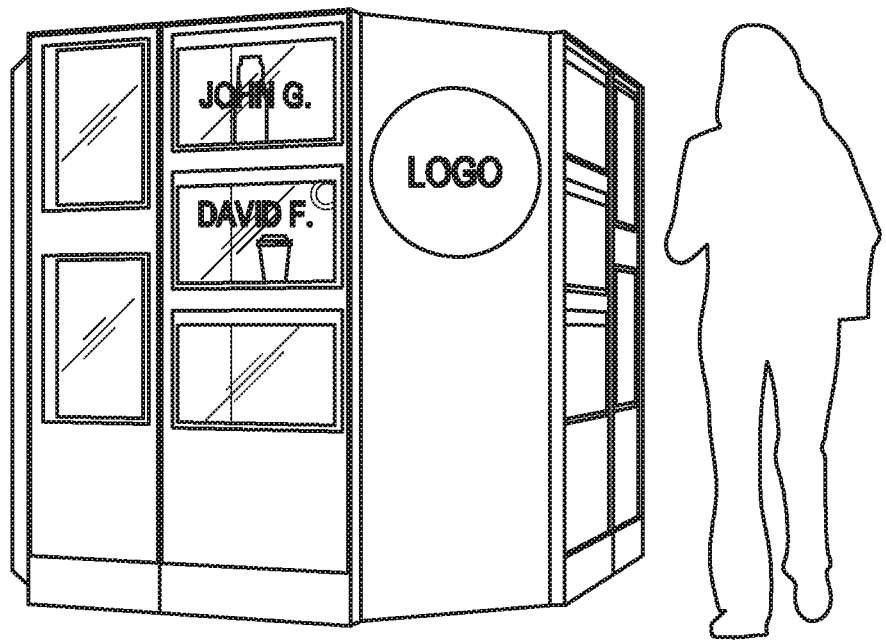
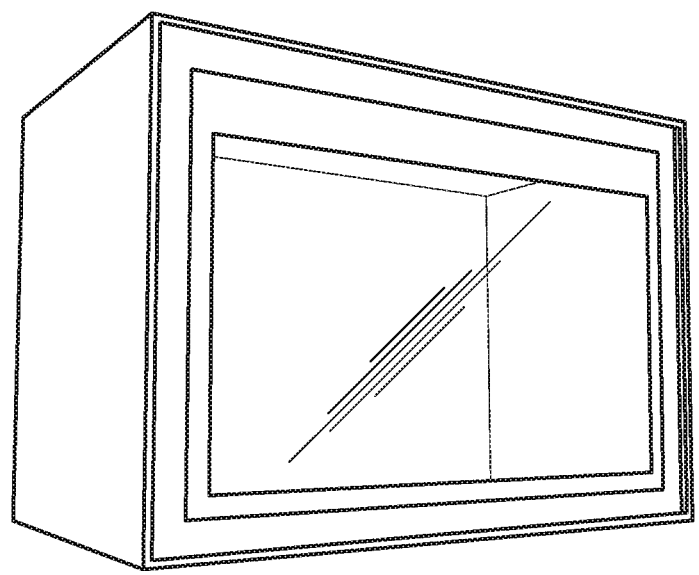
FIG. 3N

FIG. 3O
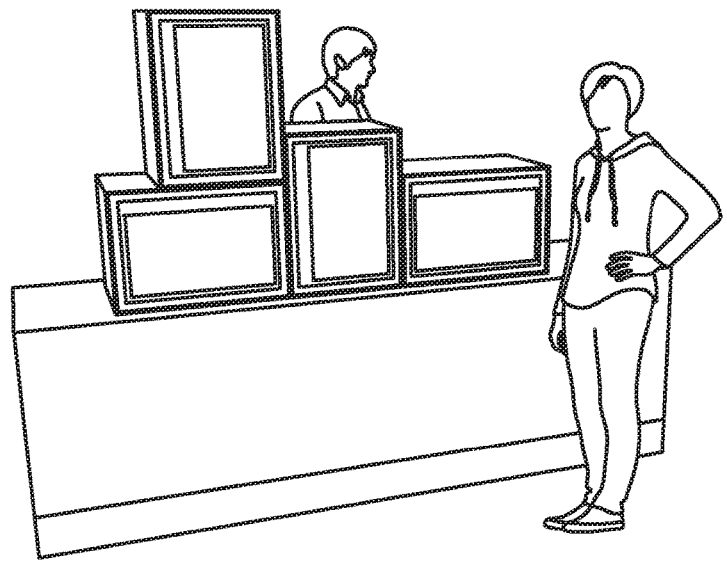
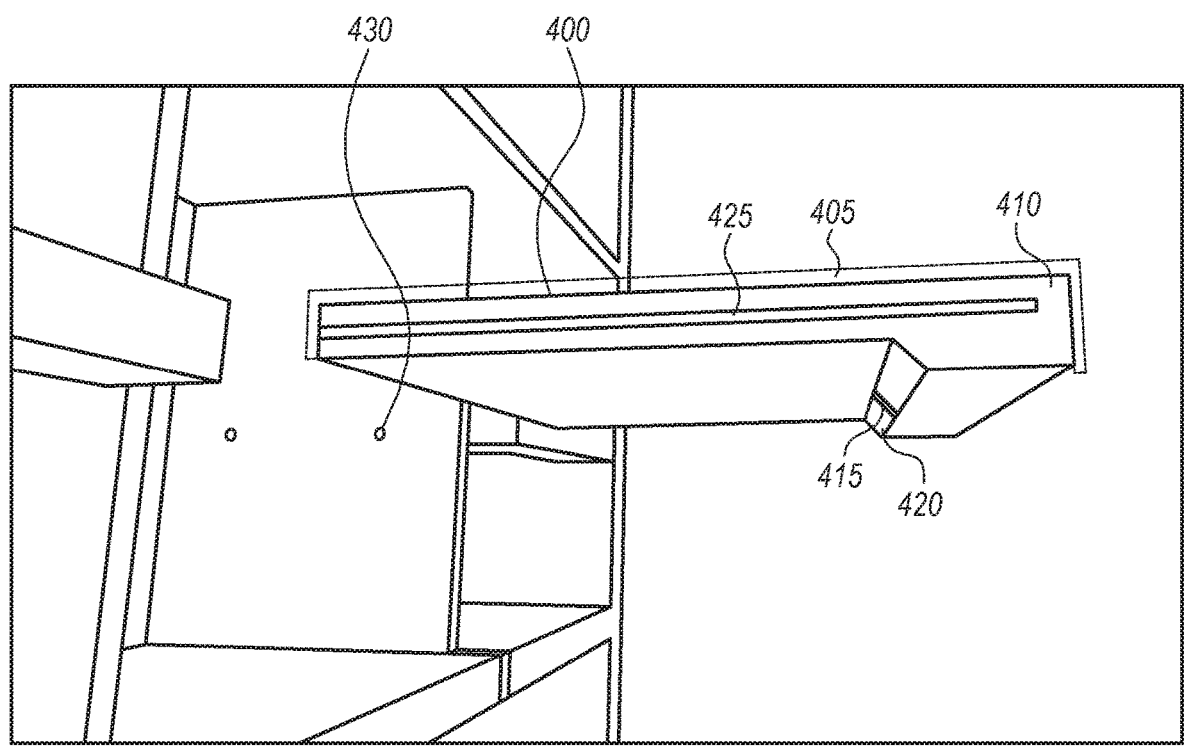
FIG. 4A

FIG. 4B
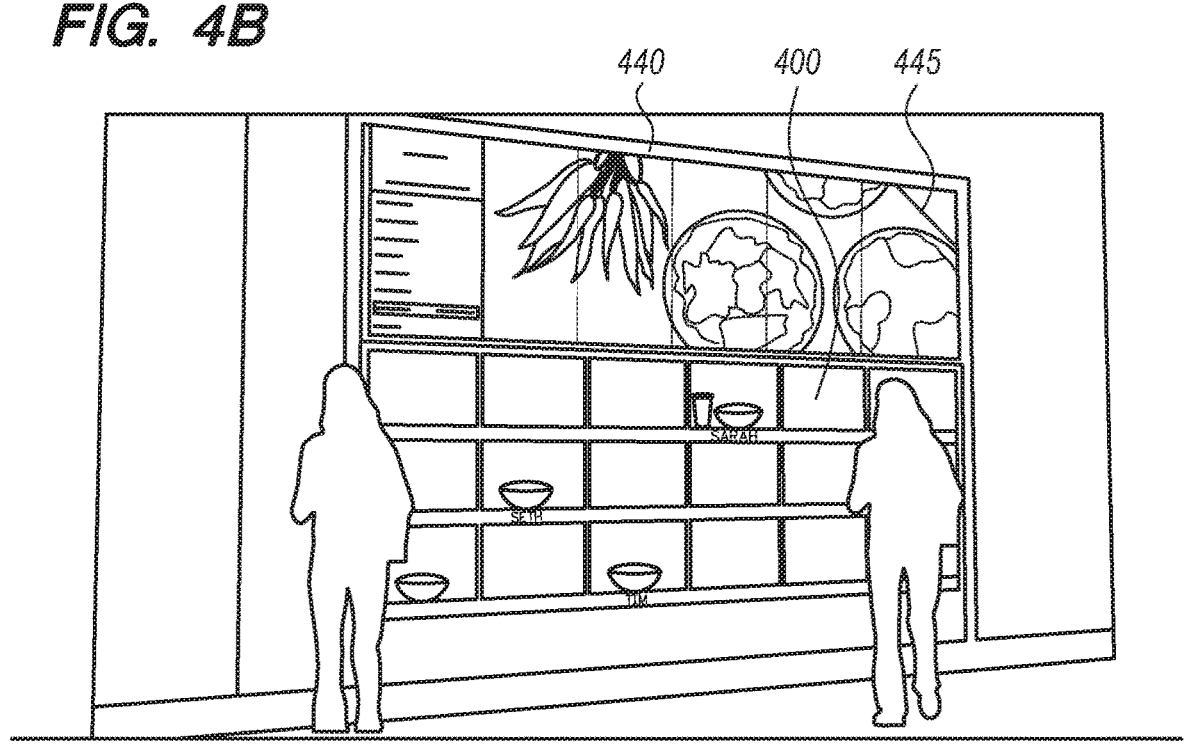
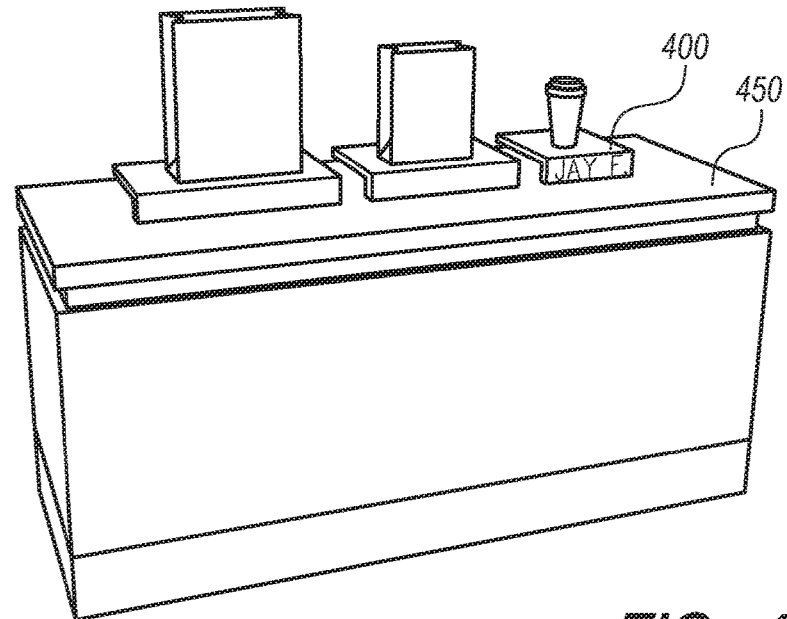
FIG. 4C

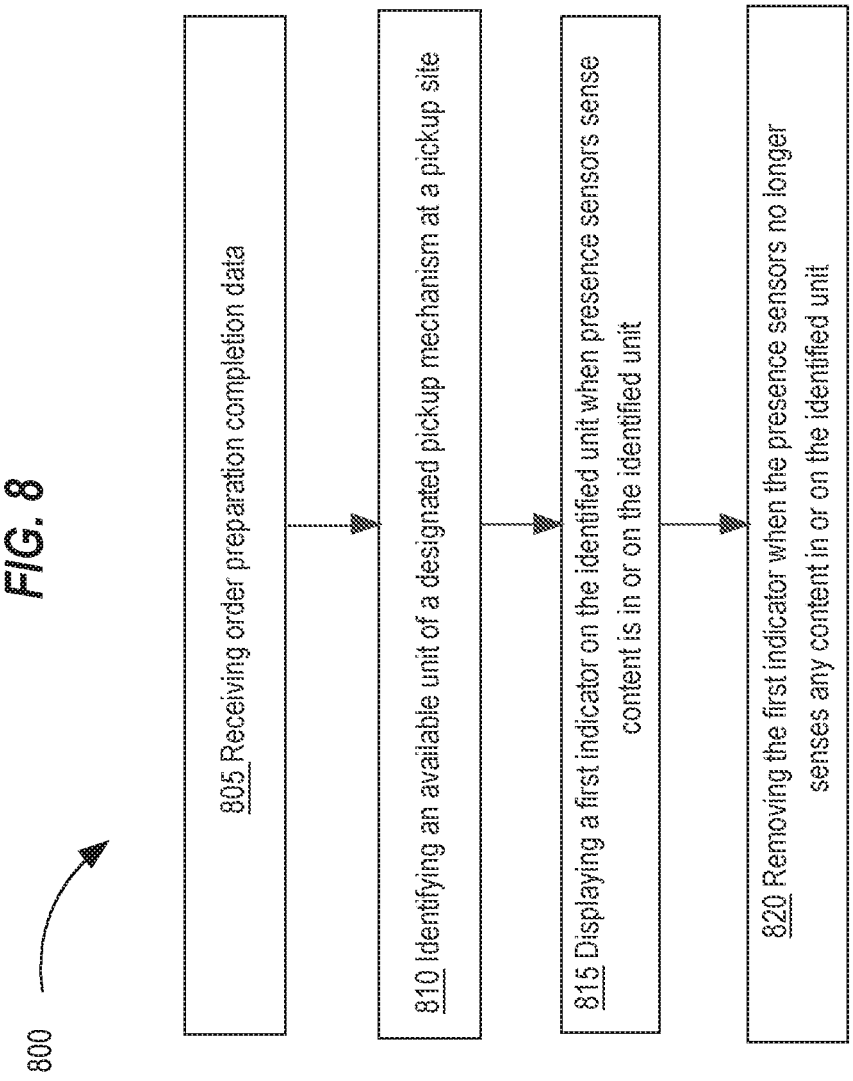

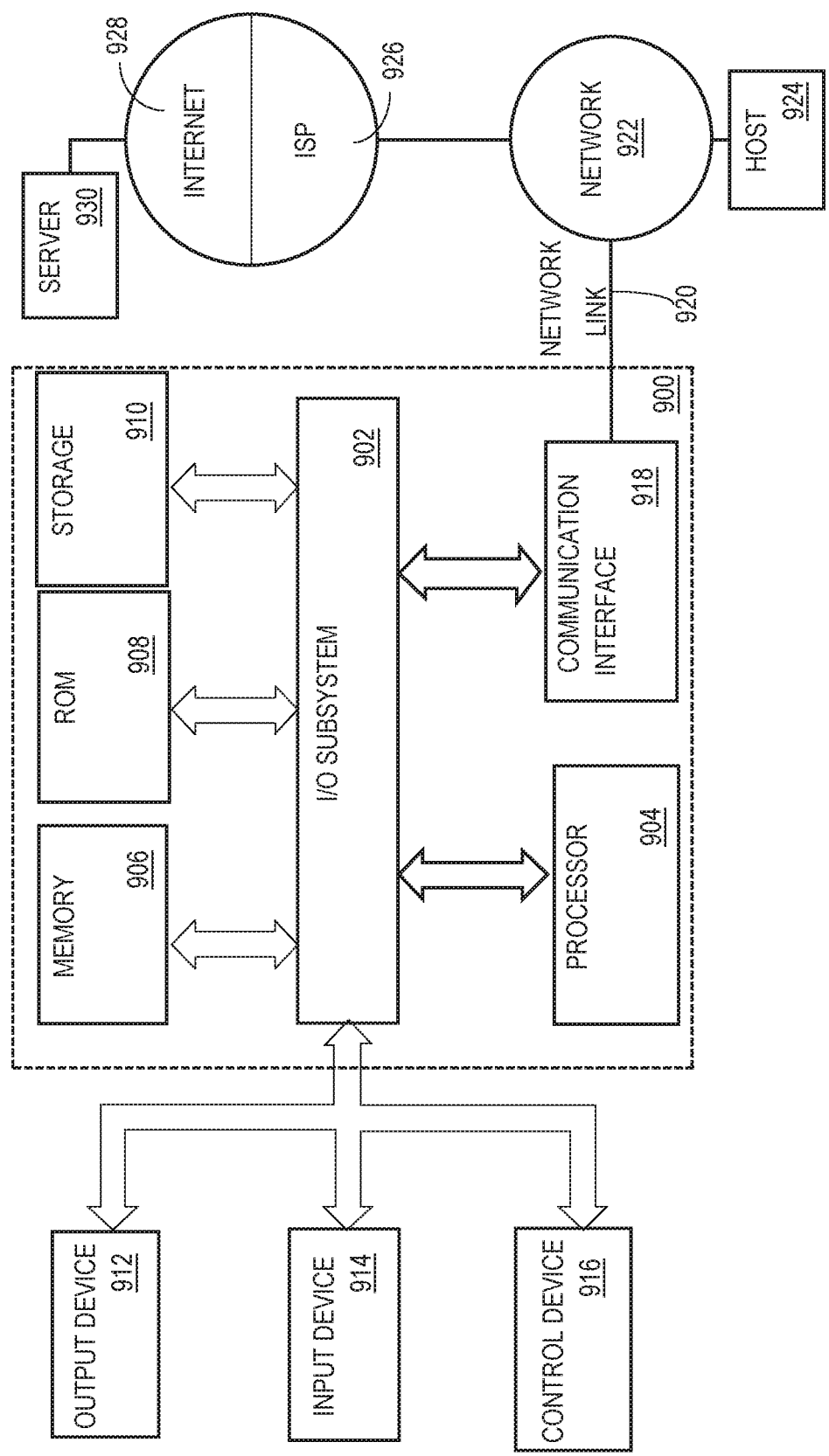

REAL-TIME PROCESSING AND MANAGING OF PRODUCT ORDERS

CROSS-REFERENCE TO RELATED APPLICATIONS

This application claims the benefit under 35 U.S.C. § 119(e) of provisional application 62/649,487, filed Mar. 28, 2018, of provisional application 62/683,767, filed Jun. 12, 2018, of provisional application 62/693,551, filed Jul. 3, 2018, of provisional application 62/718,500, filed Aug. 14, 2018, and of provisional application 62/784,225, filed Dec. 21, 2018, which are hereby incorporated by reference in their entirety as if fully set forth herein.

TECHNICAL FIELD

One technical field of the present disclosure relates to an order placement, preparation and pickup system. Another technical field is computer-implemented methods and systems for facilitating meal orders, food orders, produce purchases and product orders. Yet another technical field is providing restaurant meal displays and delivery systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The mechanism of ordering, preparation, and pickup (for example, in-store, drive through, etc.) of meals, food, and beverages in restaurants/stores (for example, traditional sit-down restaurant, coffee shop, grocery store, fast food restaurant, etc.) and food pickup services largely is based on preparation to order. Typically, waiting time is long. Even though individuals can place orders for meals remotely and pick up later to reduce waiting time, products that are prepared before pickup or sit around waiting to be picked up cannot maintain freshness. Accordingly, there is a need to shorten the time of preparing and providing products that are fresh or perishable, such as food or meals, while maintaining the quality and nutritional content of the products. There is also a need to make the process of food delivery and pickup at a restaurant a better, faster, more enjoyable experience for individuals that have placed an order.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3K, FIG. 3L, FIG. 3M, FIG. 3N, FIG. 3O illustrate example cubby column configurations, in accordance with some embodiments.

FIG. 4A illustrates a perspective view of an example intelligent shelf, in accordance with some embodiments.

FIG. 4B, FIG. 4C, FIG. 4D illustrate example shelf configurations, in accordance with some embodiments.

FIG. 8 illustrates an example method, in accordance with some embodiments.

FIG. 9 illustrates an example block diagram of a computer system upon which an embodiment of the invention may be implemented.

DETAILED DESCRIPTION

Figure 1:
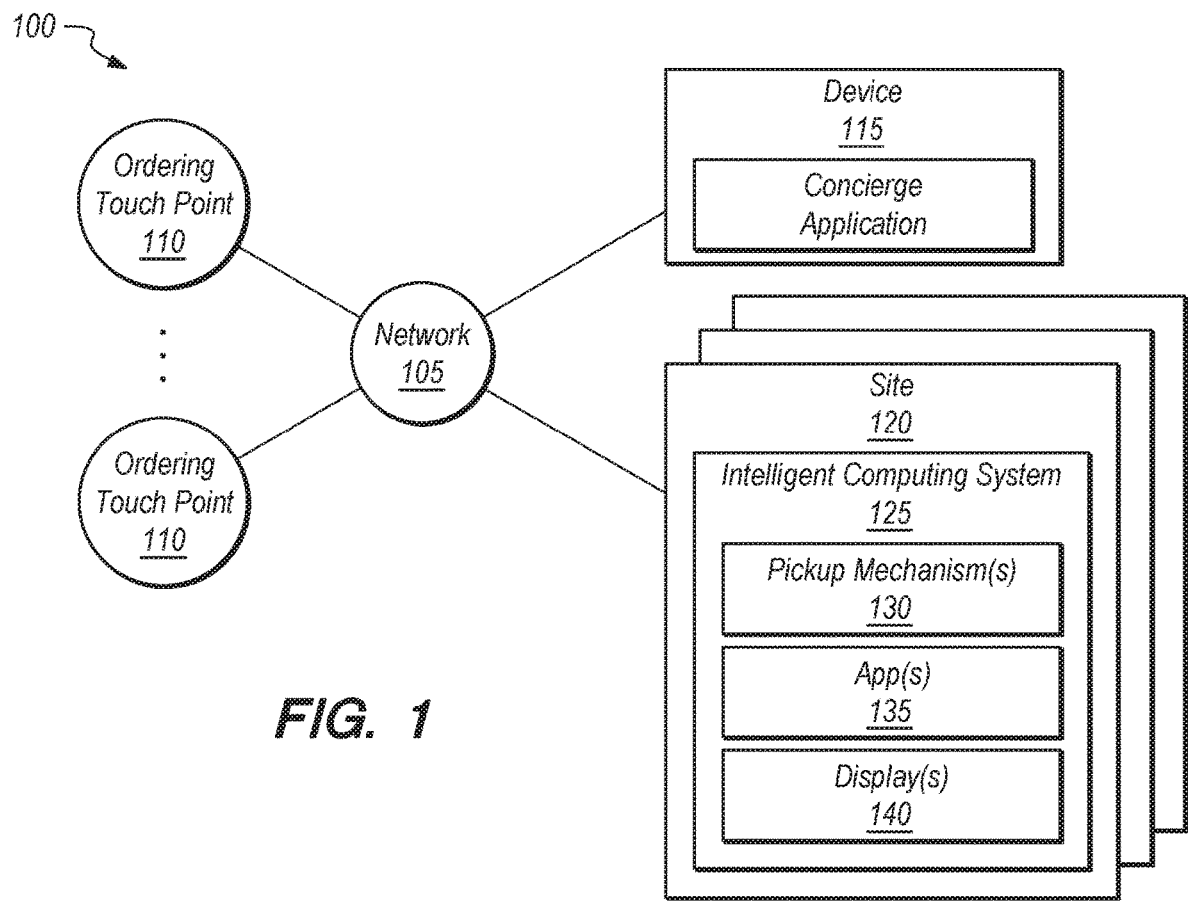
FIG. 1 illustrates an example system for product ordering, preparation, pickup of meals, food, and beverages, in accordance with some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
    2.0 SYSTEM OVERVIEW
    3.0 ORDERING MECHANISMS
      3.1 KIOSK
      3.2 ORDER PLACEMENT APPLICATION
    4.0 DESIGNATED PICKUP MECHANISMS
      4.1 CUBBY WALL
        4.1.1 RACK STRUCTURE
        4.1.2 CUBBIES
        4.1.3 MODULAR CUBBY DESIGN
        4.1.4 MAINTENANCE
      4.2 INTELLIGENT SHELF SYSTEM
        4.2.1 FRONT DISPLAY
        4.2.2 MODULAR SHELF DESIGN
      4.3 SMART TABLE
    5.0 ORDER STATUS DISPLAY BOARD
    6.0 CLIENT DISPLAY SERVER
    7.0 OPERATION AND OTHER CONTROLS
    8.0 EXAMPLE LAYOUT CONFIGURATIONS
    9.0 PROCEDURAL OVERVIEW 10.0 IMPLEMENTATION EXAMPLE—HARDWARE OVERVIEW 11.0 OTHER ASPECTS OF DISCLOSURE

1.0 GENERAL OVERVIEW

A new technical system for product ordering, preparation, pickup of meals, food, and beverages is disclosed. Specific examples are given in the context of meal, food, and beverage ordering, preparation, and pickup but the same techniques also can be applied to other products. In an embodiment, to shorten waiting time, technology communication networks and mobile computing devices allow users to order products or meals in any location. To maintain freshness of prepared foods, a pickup site, such as a restaurant or factory, is equipped with an intelligent computing system to manage orders, assemble products, and finalize product preparation. Furthermore, a management module in the system is configured to predict the quantity of source materials that are needed, with the effects of less waste and faster preparation. The system can further execute targeted marketing, with effects of higher loyalty, stronger engagement, and easier feedback capturing. Furthermore, the system may include various components for pickup of meals, food, and beverages, with the effect of a better, faster, more enjoyable experience for individuals that have placed an order.

In one aspect, an intelligent shelf is provided. The intelligent shelf comprises a top platform and an electronics module. The electronics module includes one or more sensors for sensing presence of content on the top platform, a wireless communication chip for enabling data communication over a network, a display screen for displaying dynamic messages based on the data communication and the sensing.

In another aspect, a system for managing product orders is provided. The system comprises a plurality of intelligent shelves, wherein each of the plurality of intelligent shelves comprises a base electronics module configured to showcase a product to a designated recipient. The system further comprises a plurality of modular accessories including a power interface for providing power connections to the base electronic modules of the plurality of intelligent shelves and a data interface for providing data connections to the base electronic modules of the plurality of intelligent shelves. The system further comprises one or more sensors configured to monitor presence of products on top surfaces of the plurality of intelligent shelves.

In yet another aspect, a method of managing product orders is provided. The method comprises receiving, over a communications network, an order preparation completion data. The method further comprises using one or more sensors, detecting presence of a product on a top surface of a shelf and, in response to detecting presence of the product on the top surface of the shelf, using a display screen of the shelf and displaying a first message based on the order preparation completion data. The method further comprises using the one or more sensors, detecting the shelf is empty and, in response to detecting the shelf is empty, using a display screen of the shelf and displaying a second message that is different from the first message.

Other embodiments, aspects and features will become apparent from the remainder of the disclosure as a whole.

2.0 SYSTEM OVERVIEW

FIG. 1 illustrates an example system for product ordering, preparation, pickup of meals, food, and beverages, in accordance with some embodiments. The system 100 of FIG. 1 includes customer ordering touchpoints 110, comprising kiosks and/or user computing devices such as a desktop computer, mobile computing device, smartphone, or tablet computer, that are used by individuals (for example, a purchaser, a customer, or a consumer), to order products (for example, a meal or a drink). Each ordering touchpoint 110 is programmed to display a list of products or a menu of meals or a menu of ingredients to an individual(s). The individual interacts with the touchpoint 110 to make selections and place orders over a network 105 with a product preparation site. Prepared products may be picked up at a pickup site 120. A pickup site 120 may be the product preparation site, which may comprise a restaurant, or a factory, or a food processing center, or a combination thereof.

To maintain freshness of prepared meals, foods, and beverages, a pickup site 120 may be equipped with an intelligent computing system 125 that is configured to manage orders, assemble products, and finalize product preparation. The intelligent computing system 125 may include one or more designated pickup mechanisms 130, one or more applications 135 hosted on one or more server computing devices, including a Client Display Server (CDS), and one or more display implements 140, all of which are communicatively coupled via wired and/or wireless connections. Alternatively, the intelligent computing system 125 may be hosted using a public or private cloud computing facility and communicates with site 120, either directly or indirectly. Example designated pickup mechanisms include cubbies (which may be part of a Cubby Wall), an intelligent shelf system, and smart tables. Each of these example designated pickup mechanisms is discussed in other sections herein.

The system 100 may include a concierge computing device 115 that hosts a concierge application. The concierge application may serve as a virtual assistant to handle any problems (for example, refund, discount, and the like) that the individual encounters. In an embodiment, the concierge application may be hosted by a server computing device of the intelligent computing system 125 rather than separately by the third party concierge computing device 115.

The ordering touchpoints 110, the intelligent computing system 125, and the concierge application are communicatively coupled with the network 105. The ordering touchpoints 110 and the network 105 allow individuals to order products from any location. Although the ordering touchpoints 110 are shown in FIG. 1 as being outside the product preparation site 120, one or more of the ordering touchpoints 105 may be located at the pickup site 120.

The network 105 broadly represents any combination of one or more local area networks, wide area networks, campus networks and/or internetworks. Packet-switched networks may be used with networking infrastructure devices such as switches and routers that are programmed to communicate packet data based on internet protocol (IP), a transport protocol such as TCP or UDP, and higher-order protocols at any of several different logical layers, such as those defined by the Open Systems Interconnect (OSI) multi-layer internetworking model.

3.0 ORDERING MECHANISMS

In some embodiments, an order placement application, which is accessible by a customer ordering touchpoint 110, is configured to place orders. The order placement application may be hosted by a server computing device of the intelligent computing system 125 or by a customer ordering touchpoint 110. An example customer ordering touchpoint 110 is a user computing device (for example, desktop, laptop, tablet, mobile computers, servers, smartphones, etc.) executing the order placement application.

Another example customer ordering touchpoint 110 is a kiosk comprising a computing system for an individual to order products. In an embodiment, the computing system comprises a digital processing device comprising a processor, a memory module and an operating system configured to perform executable instructions. The computing system also includes a digital display, a computer-readable medium, storing instructions executed by the digital processing device, to provide the order placement application. The kiosk may be embodied in a countertop structure for placement on a countertop, in a store's physical architecture (for example, store wall), or in a floor structure for placement on the ground, such as illustrated in FIG. 2.

3.1 Kiosk

Figure 2:
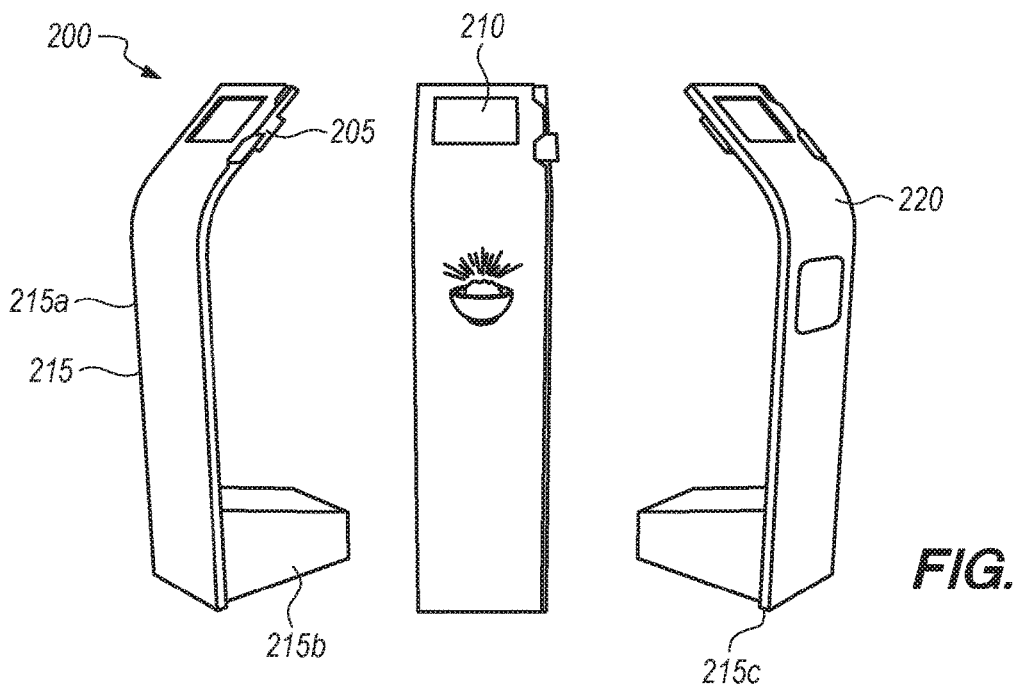
FIG. 2 illustrates an example kiosk, in accordance with some embodiments.

FIG. 2 illustrates an example kiosk, in accordance with some embodiments. In FIG. 2, a left perspective, a front perspective, and a right perspective of a kiosk 200 are shown. The kiosk 200 may be a standalone touchscreen ordering kiosk with an integrated credit card reader 205. The kiosk 200 may plug into power with an external power cord such as a USB power cord, be battery operated to remove the need for a power cord during regular operation, or include both powering modes.

A touchscreen tablet 210 may mounted inside and at a top of the kiosk 200 and may held in place by one or more cradle parts. In some embodiments, the cradle parts may be the only parts that need to be replaced in the event that the size or shape of the tablet changes.

An enclosure on a bottom of the kiosk 200 has a lid with a lock so that it may securely contain valuable technology. This locking mechanism may be a combination lock, a key lock, or another type of lock for securing the kiosk.

A single aesthetic front plate 220 is mounted to a main structure 215 of the kiosk 200 with security screws. The aesthetic plate 220 may be manufactured with custom colors, materials, and finishes to allow the kiosk 200 to mesh with a variety of restaurant concepts or brands. The structure 215 of the kiosk 200 may also be made in customized colors and finishes.

The main structure 215 of the kiosk 200 may be disassembled easily into different parts for easier shipping. A main vertical column 215a may be one part, and an enclosure 215b at the bottom may be another part. The main structure 215 may be dissembled into even smaller parts.

The kiosk 200 may also include removable and/or adjustable feet and/or wheels 215c on the bottom of the kiosk 200. The feet and/or wheels 215c make the kiosk 200 easy to install and move.

3.2 Order Placement Application

The order placement application is designed for placing orders and includes one or more interfaces. For illustrating functionalities of the present technologies, the following discussion uses meal or food order as an example, but the present technologies can be extended to any product order.

In some embodiments, an interface of the order placement application includes one or more plurality of digital menus, or a list of products. A digital menu may comprise a plurality of meals. There may be various designs of the digital menu. The digital menu may be created based on food science, culinary science, or both. The digital menu may be personalized to an individual based on a preference, historical orders of the individual, or a combination thereof. Additionally, or alternatively, the digital menu may be personalized to the individual based on a time, a month, a holiday, a season, an event, a promotion or other targeted advertising, or a combination thereof.

In some embodiments, an interface of the order placement application includes a plurality of food ingredients and may allow the individual to assemble two or more ingredients into a personalized meal.

In some embodiments, an interface of the order placement application includes a pickup location. A pickup location may be a pickup site or a product preparation site. A pickup location may be determined by retrieving a current location of the individual as manually input by the individual or automatically detected by a customer ordering touchpoint (for example, a mobile phone) using a global positioning system (GPS) receiver. A pickup location may be based on analyzing a distance between a current location of the individual and a pickup site. A pickup location is based on analyzing a distance between a current location of the individual and a product preparation site. Examples of distance include a driving distance, a walking distance, and a straight-line distance.

In some embodiments, an interface of the order placement application includes a preparation status of the order. In some embodiments, an interface of the order placement application includes a remaining preparation time of the order. In some embodiments, an interface of the order placement application includes an alert when preparation of the order is complete. In some embodiments, an interface of the order placement application includes an identifier of a cubby unit or a shelf unit that prepared product(s) is in or on.

4.0 DESIGNATED PICKUP MECHANISMS

Once an order is complete, the prepared product(s) are transferred to a designated pickup mechanism (such as Cubby Wall, an intelligent shelf system, or a smart table system), which guarantees pickup of the prepared product(s) to the designated recipient and, in some embodiments, preserves freshness of foods. The transfer of product to a particular designated pickup mechanism is done manually, automatically by a conveyor belt, automatically by a robot, or a combination thereof. When a designated pickup mechanism is in a location remote from where the product was prepared, the prepared product is moved to the designated pickup mechanism using a transportation means. A large number of designated pickup mechanisms, of the same type or of different types, may be co-located such as at a pickup site 120 of FIG. 1.

In some embodiments, a food pickup application, which may be hosted by the intelligent computing system 125 of FIG. 1 or elsewhere on the network 105, is configured to generate and output data that identifies a customer and a pickup location, such as the pickup site 120. This data may also be transmitted to a user computing device, such as a mobile device, associated with the customer, and may also be transmitted to and thus shown on an order display board 140 at the pickup location. Non-limiting examples of the data to be displayed include an order number, customer's name, or a content of an order. The food pickup application may be the same as or different from the order placement application.

A placement location, such as a specific cubby unit or shelf unit, on a particular designated pickup mechanism for picking up the prepared product may be determined and displayed to the customer at the time of ordering. Alternatively, the placement location may be determined during the product preparation process, and the customer is alerted the placement location via a message such as on a different or the same customer ordering touchpoint 110 of FIG. 1 that was previously used to place the order.

A designated pickup mechanism may include a wireless or wired network interface to communicate with a back of house manager or an assembly station at the pickup site 120. A designated pickup mechanism may also communicate with the customer ordering touchpoint 110, or a virtual assistant, such as the concierge application.

The various designated pickup mechanisms are discussed as being used for housing a prepared meal, but any one designated pickup mechanism can house any product.

4.1 Cubby Wall

An example designated mechanism is Cubby Wall. Cubby Wall encompasses a support system and/or infrastructure required for an installation of the order delivery system. In some embodiments, the Cubby Wall system may include subcomponents that are built separately in a modular fashion in a manufacturing facility, can be shipped separately, and are assembled on-site in a rapid manner. The components may be comprised of industry standard cabinet making materials such as MDF, plywood, veneers, laminates, metal brackets, metal support structures, and standard fasteners.

Figure 3A:
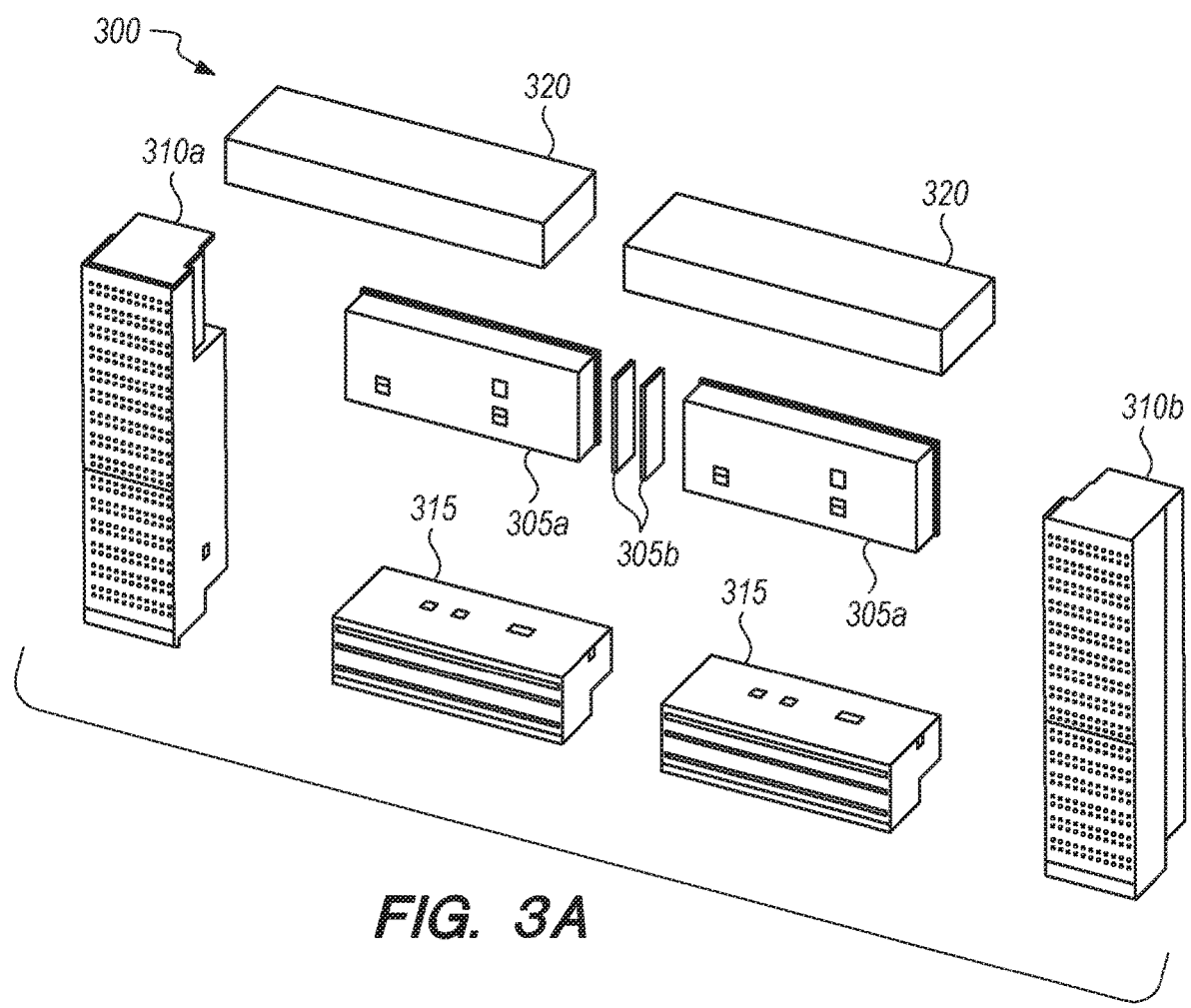
FIG. 3A illustrates example components of a Cubby Wall system, in accordance with some embodiments.

FIG. 3A illustrates example components of a Cubby Wall system, in accordance with some embodiments. The Cubby Wall system 300 may be broken into logical subsystems including a status board subsystem 305 (including display modules 305a and display module spacers 305b), a supporting column subsystem 310 (including a left cabinet assembly 310a and a right cabinet assembly 310b), a base subsystem 315 (including base units), a header subsystem 320 (including header units), and a deadfront subsystem (illustrated in FIG. 3B). The deadfront subsystem may be a front planar cover or veneer for cubbies. Each of these logical subsystems may be comprised of standard components that are manufactured separately and attached at time of install. Splitting the system into these subcomponents may reduce the installation time of the system from weeks to hours.

In some embodiments, in every component of a Cubby Wall, electrical and technical/IT trade work are incorporated into the cabinetry to assist with the installation. Components such as junction boxes, server cabinets, conduit, and other electrical and data infrastructure are integrated directly into the pre-assembled wall components to speed up installation.

Figure 3B:
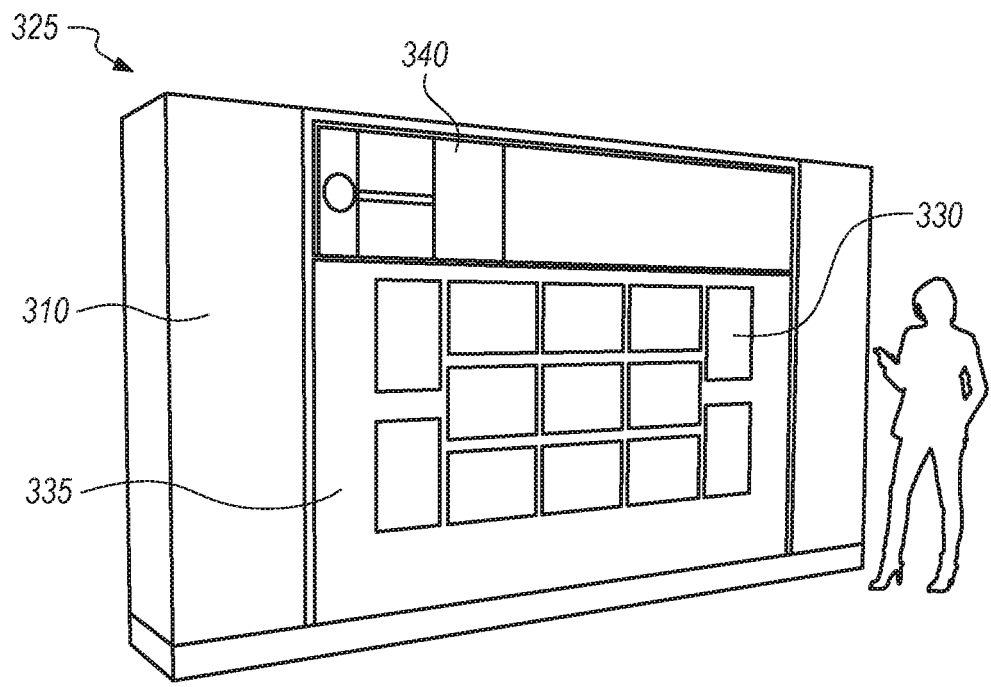
FIG. 3B, FIG. 3C illustrate example configurations of Cubby Wall, in accordance with some embodiments.

FIG. 3B illustrates an example full configuration of Cubby Wall, in accordance with some embodiments. The example full configuration of Cubby Wall 325 of FIG. 3B may comprise a plurality of cubbies 330, one or more base subsystems, one or more column subsystems 310, one or more status board subsystems, and a deadfront system 335 that together support an order status display board 340. The cubbies 330 may be in a horizontal layout, a landscape layout, or a combination of different layouts. The Cubby Wall 325 may be positioned anywhere within or at a pickup site and to partition its interior space into different sections or areas of the pickup site including a back of a house area and a front of house area.

Figure 3C:
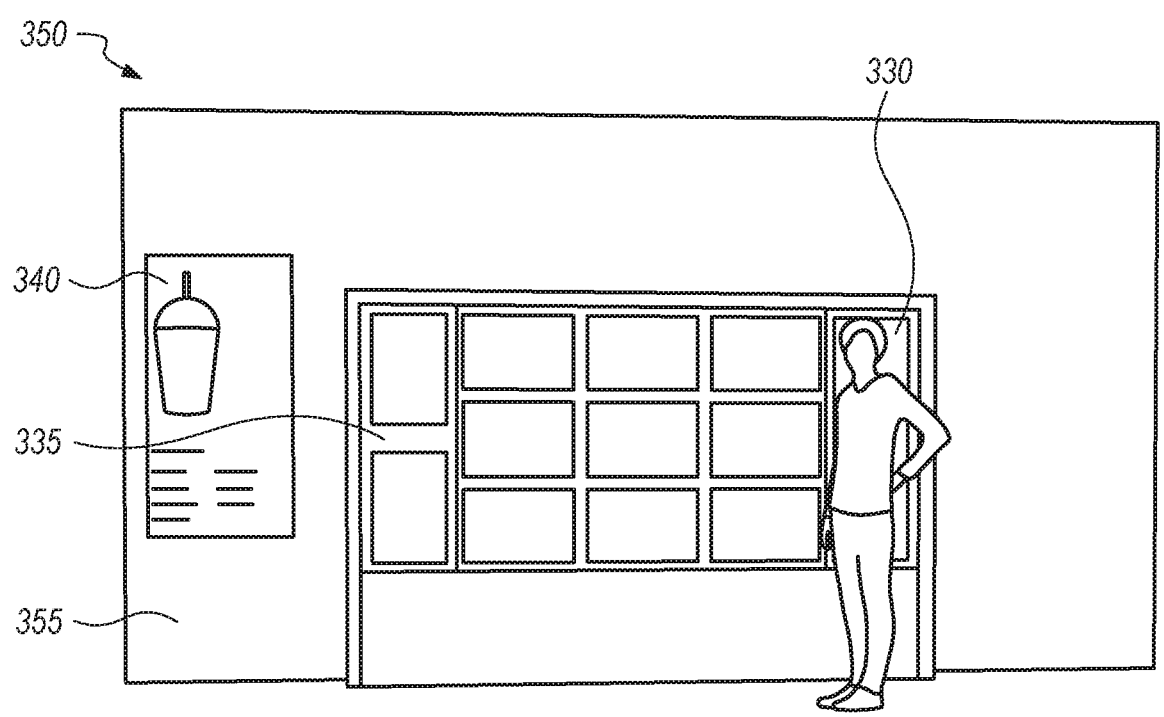

FIG. 3C illustrates an example minimal configuration of Cubby Wall, in accordance with some embodiments. The example minimal configuration of Cubby Wall 350 of FIG. 3C may comprise a plurality of cubbies 330, one or more base subsystems, a deadfront system 335, and a minimal protective component that replaces the column subsystems 310 and the status board subsystems 305 required in the Cubby Wall 325. An order status display board 340 may be mounted in any configuration on an adjacent wall 355, ceiling, or floor stand and is not directly included in the Cubby Wall 350 itself. The cubbies 330 may be in a horizontal layout, a landscape layout, or a combination of different layouts. Unlike the Cubby Wall 325, the Cubby Wall 350 is built into the existing infrastructure of a pickup site.

4.1.1 Rack Structure

Figure 3D:
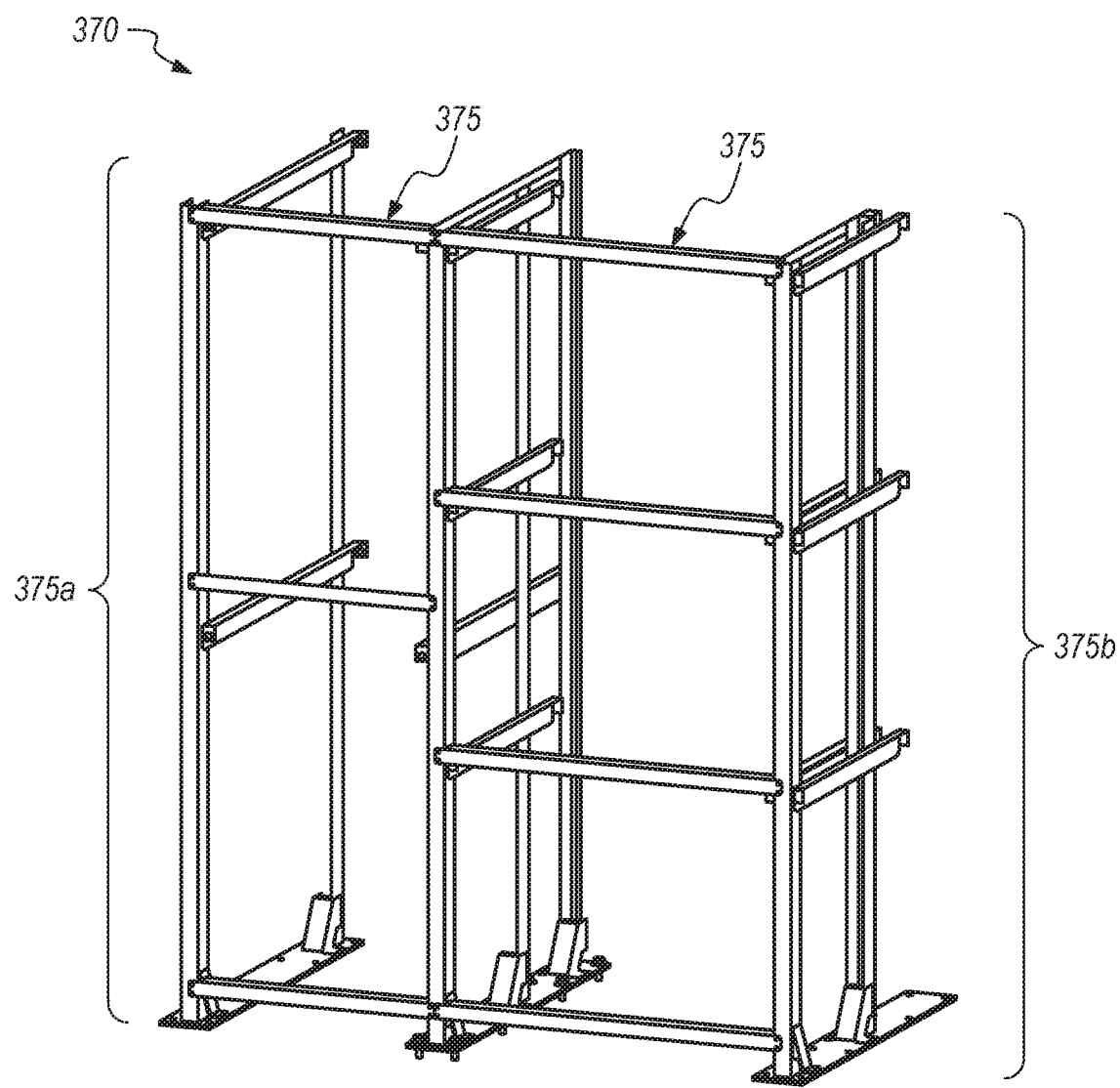
FIG. 3D illustrates an example rack, in accordance with some embodiments.

Cubby Wall may include a rack that provides a frame for cubbies. FIG. 3D illustrates an example rack, in accordance with some embodiments. The rack 370 includes a modular design that uses a small number of reversible and multi-functional racking component types to build out an array of cubby columns 375 in any desired configuration. The modular design allows for highly space efficient flat-packing.

In some embodiments, the rack 370 can be assembled with all the same fastener size/tool for low cost and fewer misplaced components. In other embodiments, the modular design is fastener-less or partially fastener-less, using component features to lock together the assembly rigidly.

The rack 370 shown in FIG. 3D includes a single layout of two cubby columns 375, although more or less cubby columns are contemplated. A cubby column may be configurable for a landscape design 375a, portrait design 375b, or any other rectangular design embodiment, such as a square design. The rack 370 is configured to receive five (5) cubbies, two (2) of which are in landscape orientation and three (3) of which are in portrait orientation. Cubby columns 375 of one or more designs may be coupled together in a single layout, sharing parts of the frame.

Custom tooling may be provided to aid in assembly, ensuring a rapid and accurate installation process. In some embodiments, smart features are self-aligning to control all tolerances and prevent improper assembly such that the rack 370 cannot be assembled backwards or incorrectly due to embedded features. For example, specifically placed location pins and mounting holes can only align if parts of a rack are correctly installed. For another example, parts are mirrored and, thus, do not require a specific orientation (any orientation works). For another example, many fasteners are identical such that any one of these fasteners may be used.

Figure 3E:
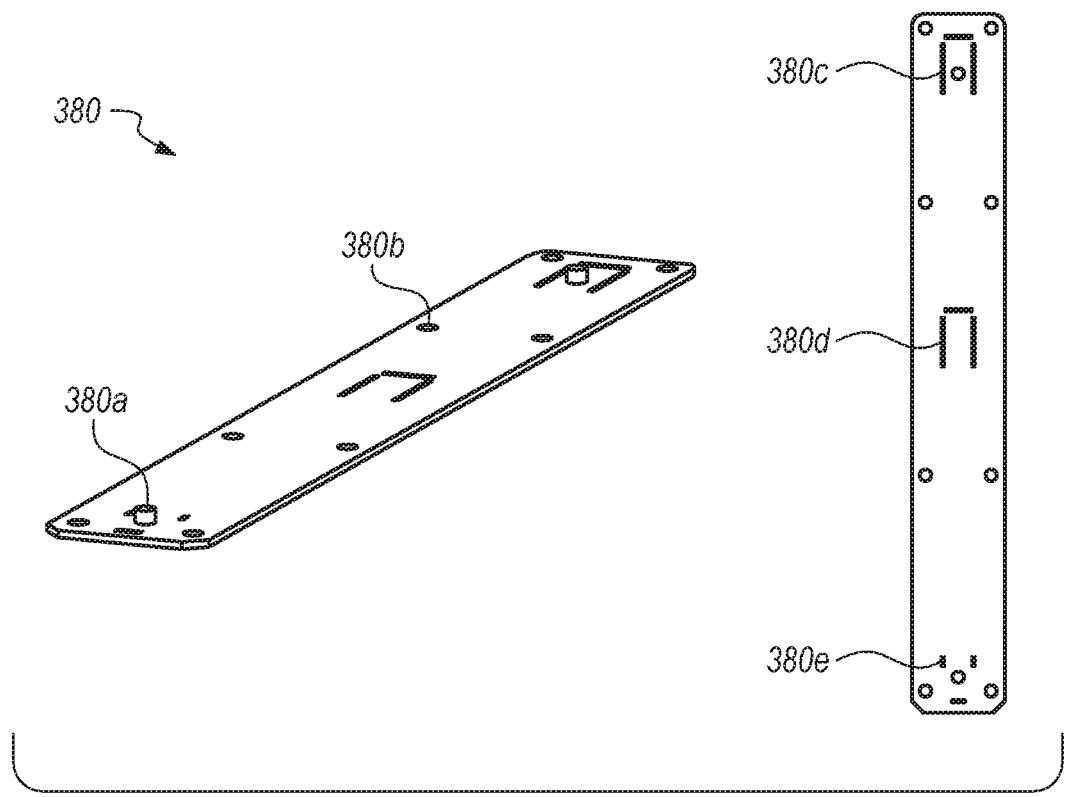
FIG. 3E, FIG. 3F illustrate example custom tooling, in accordance with some embodiments.
Figure 3F:
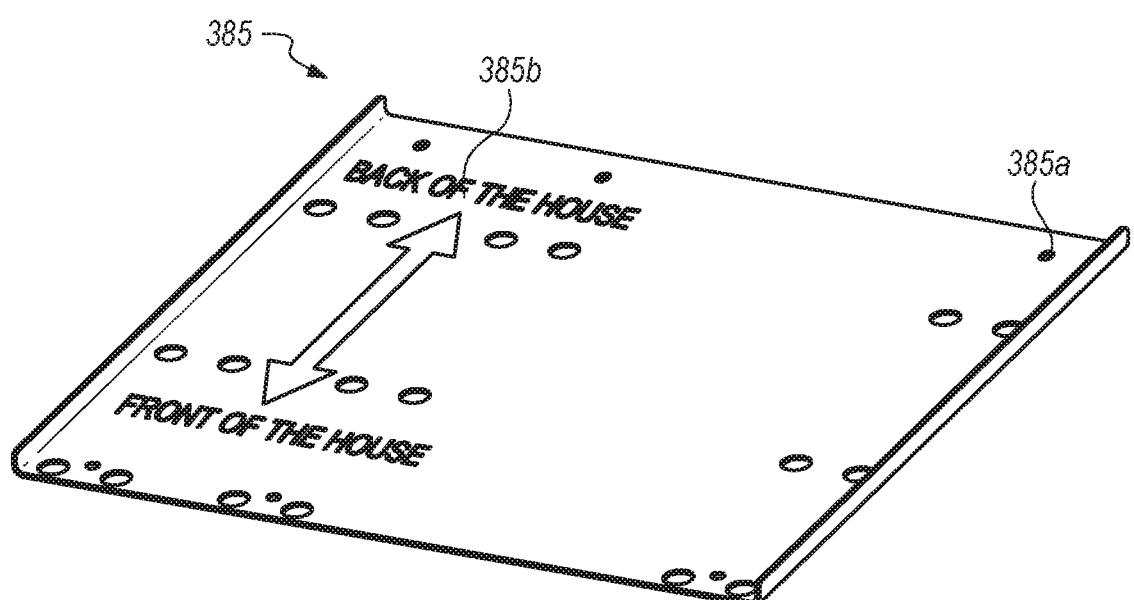

FIG. 3E, FIG. 3F illustrate example custom tooling, in accordance with some embodiment. FIG. 3E illustrates an example mounting plate 380 that can be used to mount a cubby in either in a portrait orientation or a landscape orientation. The mounting plate 380 includes location pins 380a, mounting holes 380b, and slots 380c-380e that assist during installation; these features only align if parts of a rack are correctly installed. FIG. 3F illustrates an example alignment panel 385 that can be used to align a cubby. The alignment panel 385 includes mounting holes 385a and visual markings 385b that also assist during installation.

In some embodiments, all parts and components are made from bent sheet metal for low cost. In some embodiments, at least a portion of the parts and components can be flat packed. In some embodiments, base pieces can be preinstalled at a factory and completed during field install. Alternatively, all parts are assembled in the field.

4.1.2 Cubbies

Figure 3G:
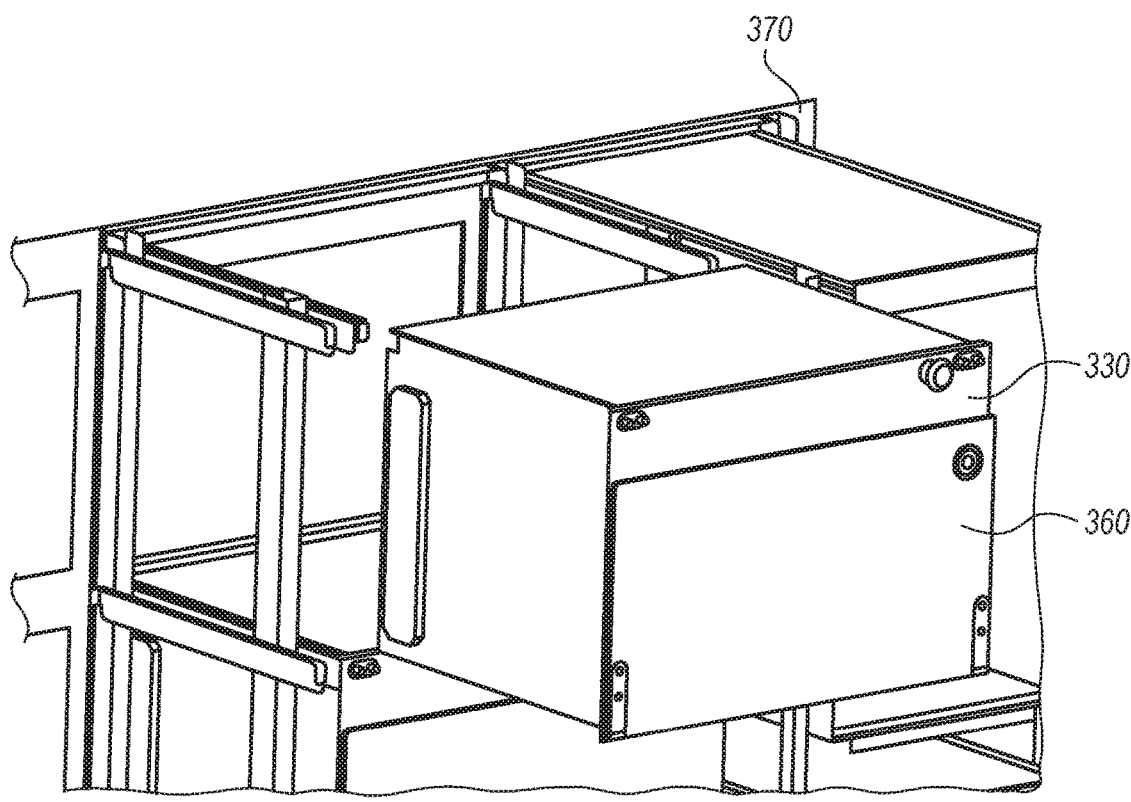
FIG. 3G illustrates an example cubby rack system, in accordance with some embodiments.

In some embodiments, there is no need to assemble anything outside a rack, such as the rack 370 of FIG. 3D. Once the rack is assembled, mounting cubbies is trivially easy and could be completed by store employees. Each cubby slides in as a single unit and can be easily swapped for maintenance. FIG. 3G illustrates an example cubby rack system, in accordance with some embodiment. A back perspective side of the cubby rack system is shown in FIG. 3G. The cubby rack system includes the rack 370 and a plurality of cubbies 330, each being in either a portrait orientation or a landscape orientation. The cubbies 330 may be of varying sizes and shapes.

In some embodiments, each cubby 330 has a standard cubby back door 360 for manually loading prepared product(s) into the cubby from the back by a store employee. In some embodiments, each cubby 330 has a cubby front door that can be opened, such as by a customer, to the prepared product within. In an embodiment, the front door may be transparent. In an embodiment, the front door comprises a digital screen configured to display or relay information, personalized messages, branded still images or animation for marketing, and/or the like.

In some embodiments, the front door comprises an LED light or a transparent LED light. The LED light may be installed inside a cubby 330 for illuminating an interior space of the cubby 330. The LED light installed inside the cubby 330 creates necessary light for transparency feature of the digital screen. In an embodiment, the information to be displayed is supplied by an in-store web server such as a Client Display Server (CDS), which is discussed in detail below.

Figure 3H:
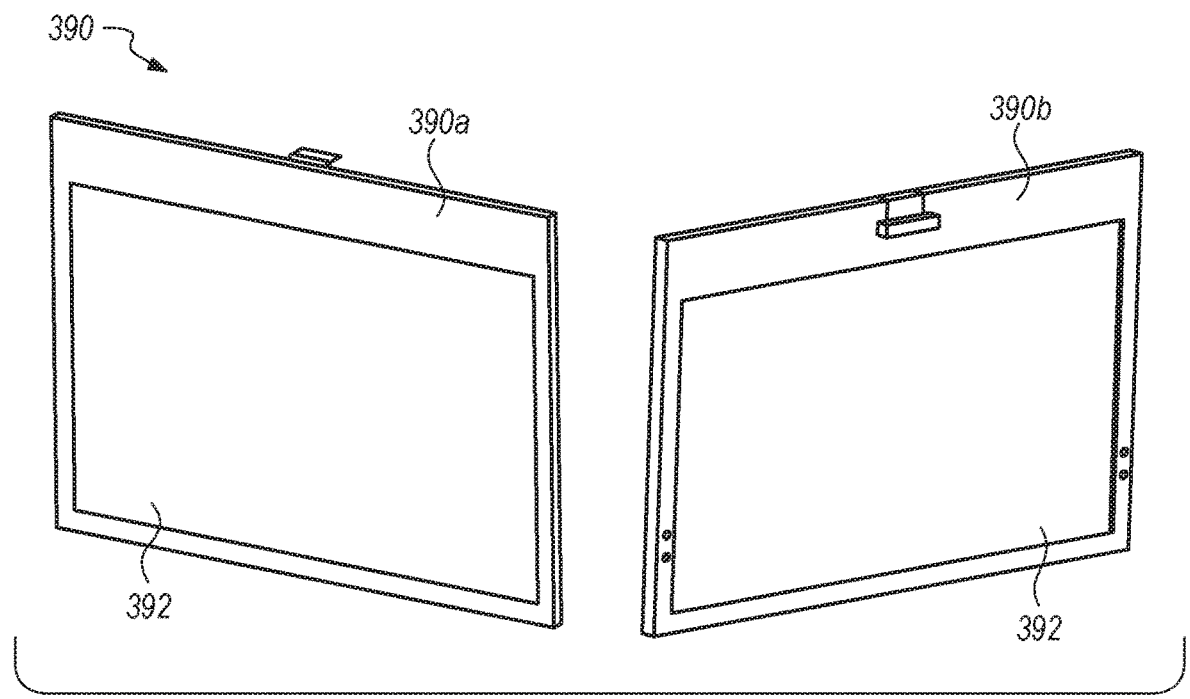
FIG. 3H illustrates perspective views of an example screen, in accordance with some embodiments.

FIG. 3H illustrates perspective views of an example front door, in accordance with some embodiment. FIG. 3H shows a front side 390*a* of the front door 390 and a back side 390*b* of the front door 390. The front door 390 may be modular and easily removed and replaced. The front door 390 may include a digital screen 392. Circuitry is self-contained with no need to have any external wires or components until installation. With a single connector for power and display/touch data, the need for multiple connection points is eliminated. The connector can be designed to be positioned at any location.

In some embodiments, the front door 390 is fastener-less. The design for the front door 390 may also be applied for variable sizes. The same fundamental design could be transformed using industry standard practices into any screen aspect ratio or size.

In some embodiments, a network interface of the cubby 330 may be configured to receive instructions from a computing device to configure the digital screen 392. The digital screen 392 may be configured to display data or indicia, such as a dynamic brand graphic, when one or more sensors detect that the cubby 330 is vacant. Example sensors include time-of-flight sensors, capacitive sensors, and break-beam sensors. The digital screen 392 may be configured to go dark when the one or more sensors detect that a prepared product is being loaded to the cubby 330. The digital screen 392 may be configured to go clear, so that the prepared product in the cubby 330 is visible through the front door 390 and digital screen 392, when the one or more sensors detect that a prepared product is placed in the cubby 330. The digital screen 392 may be configured to display an order number, a customer name, or some identifier associated with the order, when the one or more sensors detect that the prepared product is placed in the cubby 330.

To pick up the prepared product, the digital screen 392 may be configured to allow the individual to activate a mechanism of opening the front door 390. The front door 390 may be configured to automatically open upon the individual correctly activating a mechanism of opening the front door 390. The front door 390 is configured to automatically close and the digital screen 392 may be configured to display a message when the one or more sensors detect that a prepared product has been retrieved by the individual.

In some embodiments, the cubby 330 is secured by a cubby locking mechanism to ensure that only the designated recipient(s) accesses the cubby 300. The cubby locking mechanism may be unlocked by a key code or by a biometric recognition mechanism. A biometric recognition mechanism may comprise a facial recognition mechanism, a finger print recognition mechanism, a palm print recognition mechanism, an iris recognition mechanism, or a combination thereof.

In some embodiments, a safety sensing apparatus is included in a single cubby for a more efficient, standalone design. In other embodiments, the safety sensing apparatus may be mounted directly on the ceiling, wall, or floor of the installed location. In other embodiments, the safety sensing apparatus can be mounted on the surrounding cubby wall infrastructure. The safety sensor apparatus may be configured to detect an obstruction, such as a hand, in a way of the front door 390 when the front door 390 is moving. In some embodiments, the front door 390 stops moving when an obstruction is detected.

Figure 3I:
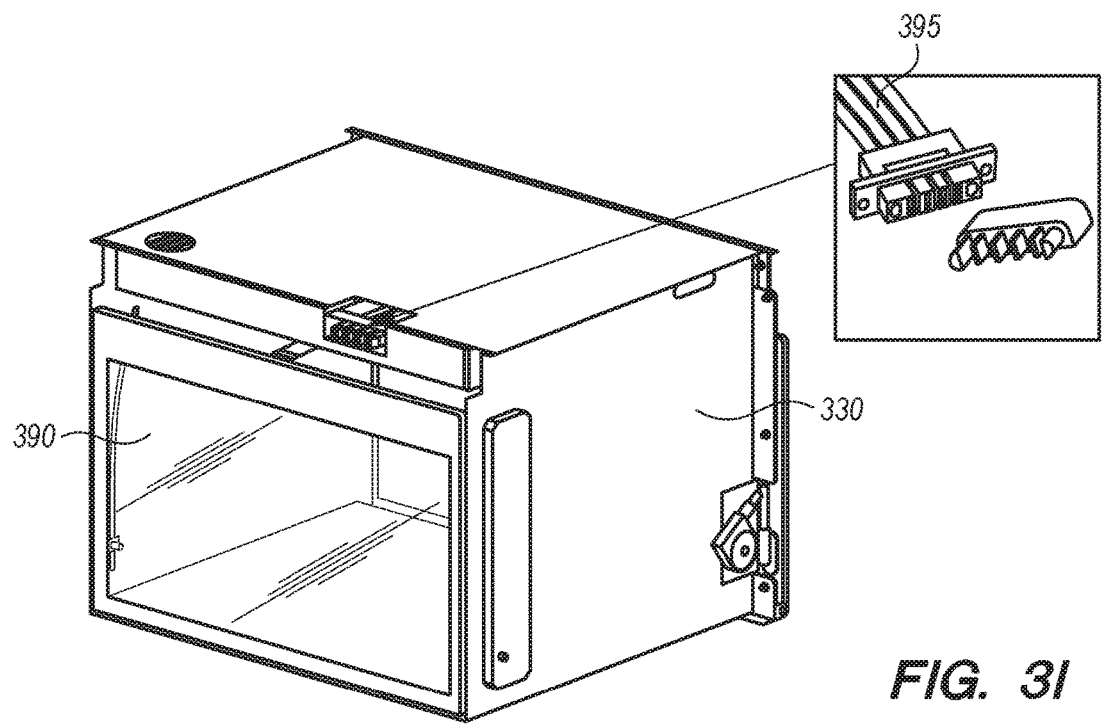
FIG. 3I illustrates an example front perspective of a cubby, in accordance with some embodiments.

FIG. 3I illustrates an example front perspective of a cubby, in accordance with some embodiment. The cubby 330 includes a front door 390 and quick mate connectors 395. In an embodiment, the quick mate connectors 395 are located along a top edge of the cubby 330. The quick mate connectors 395 automatically make electrical contacts when the cubby 330 is installed and fully seated with respect to a deadfront subsystem, such as the deadfront subsystem 335 of FIG. 3B.

Cubbies 330 may be self-contained with all drive and data components part of one singular modularized unit. In some embodiments, the power conversion from main power to unit power may happen inside each cubby 330 itself. In other embodiments, the power conversion may occur in a surrounding infrastructure.

In some embodiments, the interior of a cubby 330 is seamless and does not include any visible hardware. The cubby 330 may be made of one bent sheet metal structure with all fasteners placed externally, which makes the cubby 330 easy to manufacture and simple to assemble. The seamless and fastener-less interior also makes the cubby 330 easy to clean and sanitize. The seamless and smooth interior also increases the cubby's usable volume and adds a clean and spacious aesthetic. A removable drip tray may be added inside the cubby 330 for cleanability and/or customization.

In some embodiments, an external finish/coating is applied to exterior surfaces of the cubby 330 to reduce the likelihood of scuffs and scratches.

When an order is taken, such as by using an order placement application, the order is tracked in the system and sent to store employees for preparation. Once the order is finished, the system may find an empty cubby 330 and notify the store employee which cubby 330 to place the prepared product in. Alternatively, the system may have the store employee input an identifier, such as a number, of an empty cubby 330 and, then, direct the store employee to place the prepared product in that cubby 330. Alternatively, the store employee may place the prepared product in the cubby 330, and the system will recognize which order it belongs to. Alternatively, the store employee may scan an identifier on the order, and the system will recognize the order and assign it to a cubby 330.

The front door 390 for the cubby 330 may then display the name or order number of the customer whose order it contains. Alternatively, the front door 390 for the cubby 330 does not display a name or order number and the store employee helps the customer find the order. When the order is picked up, the cubby 330 then senses that the prepared product has been taken and communicates to the system that the cubby 330 is now empty and ready for another order to be placed in it.

In some embodiments, it is desirable to automatically load the cubbies from the back of the cubbies, and perhaps from the back of house, replacing or supplementing a human operator. Multiple subsystems may be implemented to achieve an automated cubby loading. Such subsystems include, but are not limited to, an automated cubby back door, semi-automated access to food storage/holding equipment to allow for automated food handling, and an automated food transfer subsystem between the food holding subsystem and the cubbies.

In some embodiments, a modular back door assembly may be used. The standard, manual assembly, such as the backdoor 390 of FIG. 3G, can be easily replaced with many different types of doors including automated door assemblies. An automated door assembly, in one embodiment, is comprised of an actuator, a control system, a mounting frame, and a door component. The actuator may be a servo, a directly attached or geared DC motor, a pneumatic actuation system, a solenoid actuator, or any other standard industrial actuator. The door component may be actuated in several different ways. For example, it may be actuated as a roll-up door. For another example, it may be actuated as a barn door or French-style door. One of the driving constraints for the door geometry is the avoidance of interference with adjacent systems and, as such, compact designs are preferable.

The automated back door assembly may be integrated with a state machine of the cubby system, such that it replaces the manual interaction of a handle/mushroom button and operator loading with an automated interaction that is interchangeable and unnoticeable from the customer's point of view.

To complete the automated loading process, prepared product(s) to be loaded are accessible to the automated food transfer subsystem. The prepared product to be loaded may be stored inside of a food storage apparatus (such as a hot hold or a cold hold system). To access the prepared product, the food storage apparatus may be augmented with an automated access subsystem. This subsystem may comprise of several mounting brackets and an actuator (which may be pneumatic, hydraulic, or electrically controlled) that is able to open the back door to the food storage subsystem. The actuation of the automated access system is controlled by a state machine that also has visibility into states of other associated subsystems, and runs either on a local server or in the cloud.

In some embodiments, the food storage subsystem is a purpose built for the automated pickup of food. In other embodiments, the food storage subsystem is a modified version of a pre-built system. Modifications may include an accommodation for the mounting of the automated access system, a storage method wherein the food objects are made more discrete to assist the transfer system in locating a single food object, or other modifications which enhance access to food objects for the automated food transfer subsystem.

The automated food transfer subsystem may access food inside the food storage subsystem and move that food into the cubby system. Access to the food inside the food storage subsystem may be enabled by the automated access system, and access to the cubby system may be enabled by the automated back door assembly.

The automated food transfer subsystem may be constructed in several ways. For example, the transfer subsystem may comprise a single off-the-shelf robotic arm or SCARA manipulator, customized with an end-effector that is able to manipulate the food object. For another example, the transfer system may comprise a multi-axis gantry system with an end-effector that is able to manipulate the food object. For yet another example, the transfer subsystem may comprise a series of conveyors and elevators that are able to manipulate the food object.

The automated food transfer subsystem may be controlled by a controller that is able to access the state of both the automated access subsystem and the automated back door assembly.

In some embodiments, the transfer food subsystem does not pick up the food object from the food storage subsystem but, instead, picks up the food object directly from a heating or cooking apparatus. In another embodiment, the transfer food subsystem picks up the food object from the food storage subsystem and delivers it to a heating or cooking apparatus instead of to a cubby.

In some embodiments, it is desirable to integrate the heating or cooking of food into the automated food loading system. This could allow the cold storage, reheating, and delivery of a food object without any human interaction. The elimination of human interaction may be desired for food safety reasons, for the elimination of undesirable labor profiles, or for a reduction in operating costs.

In some embodiments, the food storage subsystem is a cold storage unit and is augmented with the automated access subsystem. The automated access subsystem may enable access to the food by the automated transfer subsystem, which may transfer the food object to a heating or cooking apparatus. After the food is heated or cooked, the automated transfer subsystem may transfer the food object to a cubby through its automated back door. This system may be controlled by a single controller and may be able to orchestrate the state of all subsystems in unison. Each subsystem may or may not also have its own controller.

4.1.3 Modular Cubby Design

Figure 3J:
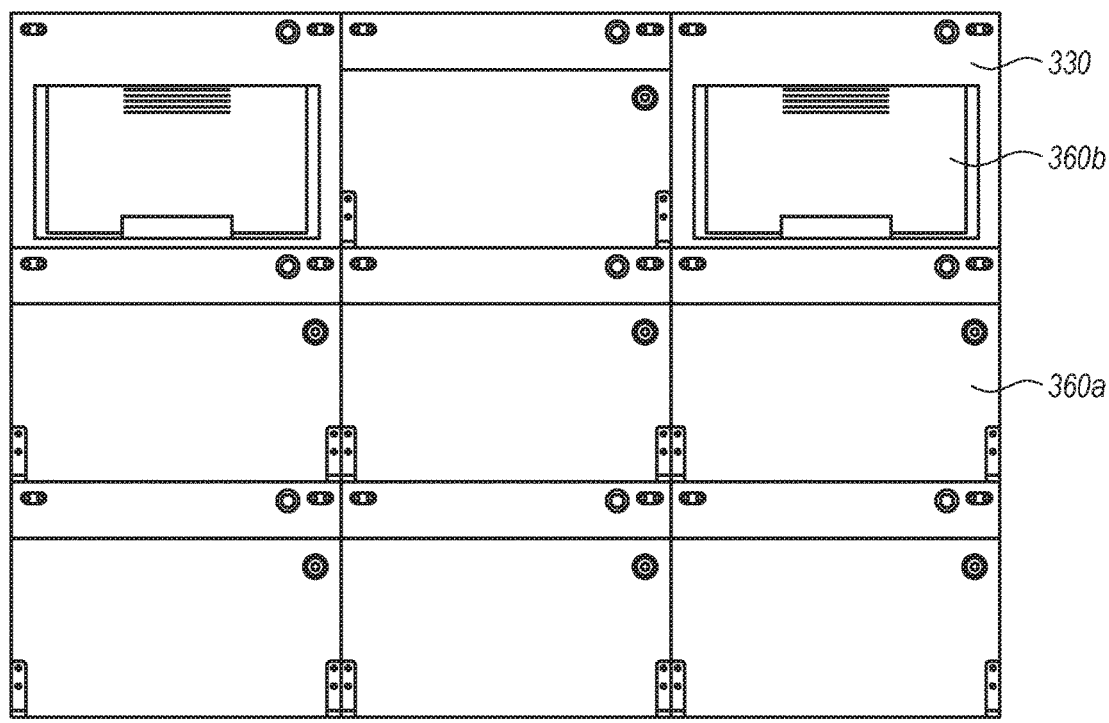
FIG. 3J illustrates an example arrangement of cubbies, in accordance with some embodiments.

In some embodiments, rack structures, cubby sizes, and screen ratios may be of variable sizes and are configurable depending on application needed within a store environment. For example, FIG. 3J illustrates a back perspective of a configuration of nine (9) cubbies 330 in a single 3×3 landscape layout. Some of the cubbies 330 have a manual backdoor 360a, while others have an automated door assembly 360b. In some embodiments, design of the cubby can be further customized by changing the finish on all the parts.

In some embodiments, each cubby is NSF (National Sanitation Foundation) compliant as it has a seamless cubby interior and very tight external seams and is, therefore, useable in food industry. However, the cubbies can also be applied in non-food based applications.

The modular cubby column design may be a free-standing implementation rather than built into a wall. Each cubby column may include cubbies in a landscape orientation, portrait orientation, or a combination of different orientations. A landscape configuration of a cubby column may have one or more landscape aspect ratio cubbies in a vertical column. A portrait configuration of a cubby column may have one or more portrait aspect ratio cubbies in a vertical column. Each cubby column may be self-contained and only require a single power and data connection in. It may also have a single power and data connection out to provide power and data to another cubby column. The power and data connections between multiple cubby columns could be daisy-chained so that a deployment of multiple cubby columns would only require one external power and data connection in. Ethernet switches and power supplies for each cubby column would be contained in the column base.

Each deployment of cubby columns may include a combination of one or more landscape and/or portrait cubby columns. As free standing columns, they may be set up within one or more holes or inserts cut in a wall, as standalone columns sitting on the floor, in continuous groups of adjacent columns, or discontinuous groups.

Each cubby column has an integrated structure to allow the cubby column to be free standing. Standardized attachment points on the exterior of the structure of each cubby column could be used either to attach customizable exterior aesthetic surfaces or to attach one cubby column to another.

FIG. 3K, FIG. 3L, FIG. 3M, FIG. 3N, FIG. 3O, FIG. 3P illustrate example cubby column configurations, in accordance with some embodiments.

Figure 3K:
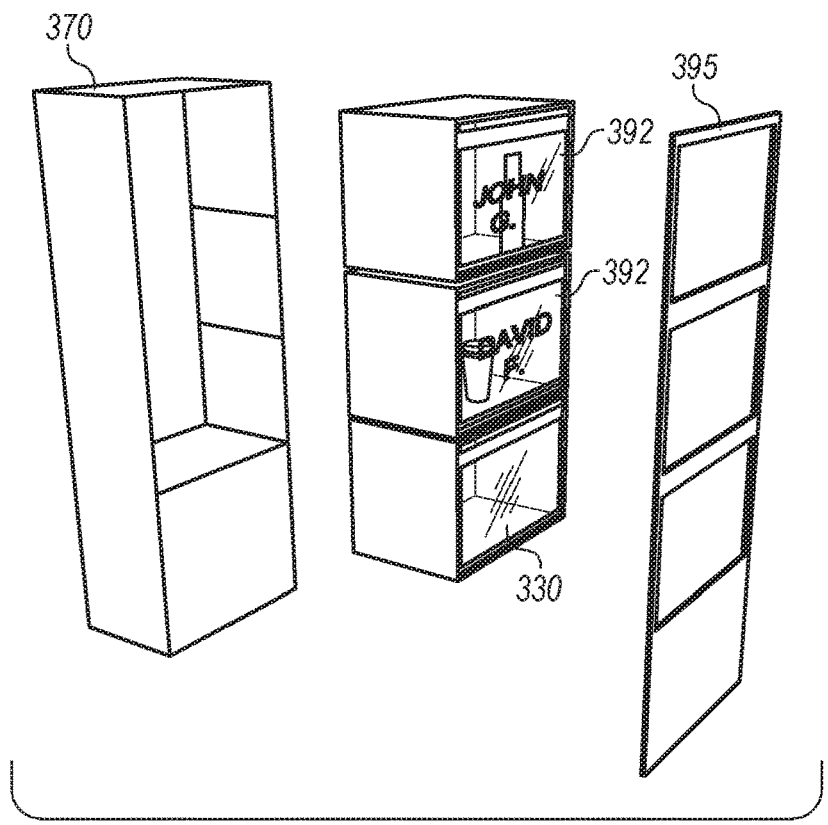

FIG. 3K illustrates an exploded view of a single cubby column. In FIG. 3K, a rack 370 is configured to receive three (3) cubbies 330 that are in landscape layout. The rack 370 may have side surfaces made of wood, plastic, or other materials. A deadfront subsystem 395 may attach to the front of the rack 370. Both cubbies 330 in FIG. 3K are in use. The display screen 392 of the top cubby displays the customer's name, "John G.," while the display screen 392 of the bottom cubby displays the customer's name, "David F." Other graphical images can be displayed.

Figure 3L:
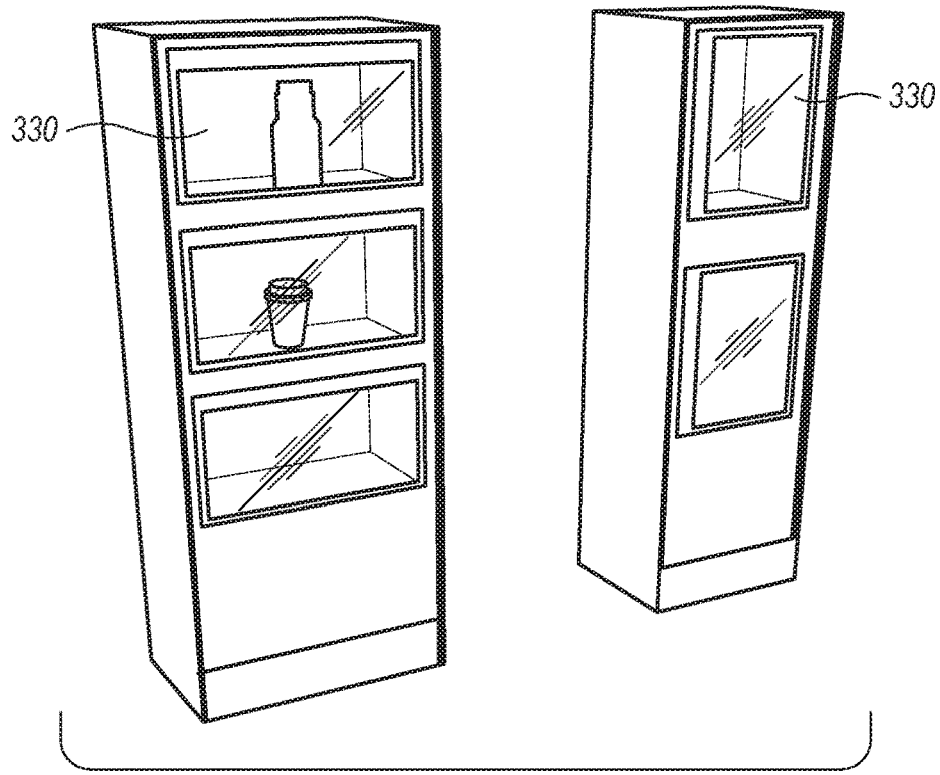

FIG. 3L illustrates two different cubby column configurations. The cubby column on the left includes three (3) cubbies 330 in landscape layout, while the cubby column on the right includes two (2) cubbies 330 in portrait layout. In some embodiments, the height dimensions of the cubby column configurations are the same such that when they are placed together in a Cubby Wall, as illustrated in FIG. 3B, FIG. 3C, or in a free standing unit, as illustrated in FIG. 3M, the tops of the columns are flush. A free standing unit may include a plurality of sides, with some sides configured for advertising or marketing purposes or configured with an order display board. For example, a free standing unit may have "cubby" sides alternating with "advertising/marketing" sides.

FIG. 3N illustrates a singular cubby in landscape layout. The singular cubby has a modular design and, as such, a plurality of singular cubbies may be arranged in an aesthetically pleasing manner on a countertop, as illustrated in FIG. 3O. The plurality of singular cubbies shown in FIG. 3O includes two singular cubbies in landscape layout and two singular cubbies in portrait layout. However, any number of singular cubbies may be used and arranged depending on application needed within a store environment.

4.1.4 Maintenance

Embodiments of the cubby design allows for several modalities of technical support and service. The racking, single-cubby design does not preclude on-site maintenance. In some embodiments, on-site maintenance is required for some types of failures such as a failure of a cubby to disengage from a rack or for preventative maintenance that is more efficiently executed to an entire Cubby Wall at one time. In the case of on-site maintenance, industry standard procedures are followed. Technicians travel to a site with spare parts in hand or stored on-site and perform either preventative maintenance on a pre-set schedule or complex diagnostic procedures as needed for break-fixing.

The racking, single-cubby design also allows for a depot maintenance model. The cubbies, as described above, require only a very limited technical knowledge base to remove and replace the cubbies. This allows a store employee to replace the cubbies themselves, reducing downtime of the store and travel cost for the servicing organization. Once removed, a cubby can be placed in either a pre-prepared shipping container or, alternatively, a commercially available container or box and shipped to a central maintenance facility, such as the factory that originally produced the cubby. The centralized nature of a depot maintenance allows for much greater economies of scale in the actual act of performing maintenance procedures, as technicians can specialize to a higher degree in different procedures or more costly capital equipment can be developed to execute different maintenance and test procedures.

4.2 Intelligent Shelf System

In an embodiment, an intelligent shelf system comprises a modular technology utilizing intelligent shelves that also solves the problem of matching restaurant orders with customers after orders have been completed. An intelligent shelf is used for housing and delivering a prepared product(s) to a designated recipient. The intelligent shelf system has been designed to be extremely flexible in how it is deployed so that it can fit into the operational model of restaurants of various sizes, brands, layouts, types, and throughputs.

FIG. 4A illustrates a perspective of an example intelligent shelf, in accordance with some embodiments. The shelf 400 shown in FIG. 4A has a top landing platform 405 for receiving a prepared product(s), a front display 410, such as a LCD screen, to display information, a food presence sensor 415 to sense the presence of the prepared product on the shelf 400, and a light source 420, such as one or more LEDs, to illuminate the prepared product, and a channel 425 along both sides of the shelf 400 to receive cords/cables running from the front display 410 and/or the light 420 to a power source and/or data source. The shelf 400 may include attachments, such as hooks, for coupling with other shelves 400 or structures. The shelf 400 may sit on low profile pegs 430 of a shelfing structure.

In some embodiments, the front display 410 is located behind a layer of wood veneer. In an embodiment, the light 420 is on an underside of the shelf 400 to illuminate food when the shelf 2015 is loaded thereon. The illumination may be directed upwards and/or through the top landing platform 405.

In some embodiments, the shelf 400 detects the presence of an item(s) by capacitive sensing. Alternatively, the shelf 400 may detect the presence of an item(s) with a time-of-flight sensor such as an ultrasonic range sensor, an IR range sensor, or a LIDAR sensor. Alternatively, the shelf 400 may detect the presence of an item(s) with a break-beam sensor. The shelf 400 may utilize sensor fusion across multiple sensors to ensure the detection of an item(s) is accurate. In some embodiments, the shelf 400 does use any sensors but, instead, uses an open-loop algorithm to infer the presence of food.

When an order is taken, such as by using an order placement application, the order is tracked in the system and sent to store employees for preparation. Once the order is finished, the system may find an empty shelf 400 and notify the store employee which shelf 400 to place the prepared product on. Alternatively, the system may have the store employee input an identifier, such as a number, of an empty shelf 400 and, then, direct the store employee to place the prepared product on that shelf 400. Alternatively, the store employee may place the prepared product on the shelf 400, and the system will recognize which order it belongs to. Alternatively, the store employee may scan an identifier on the order, and the system will recognize the order and assign it to a shelf 400.

The front display 410 on the shelf 400 may then display the name or order number of the customer whose order it contains. Alternatively, the front display 410 on the shelf 400 does not display a name or order number and a store employee helps the customer find the order. When the order is picked up, the shelf 400 then senses that the prepared product has been taken and communicates to the system that the shelf 400 is now empty and ready for another order to be placed on it.

In some embodiments, there are colored lighting to accentuate food items on the shelf 400 (and neighboring shelves) and create interest when not in use. The lighting may be on the top or bottom of a shelf unit depending on the deployment type. The lighting may be used to indicate various states of the unit. It may be programed with a specific color and visual pattern, such as a pulse. The colors and visual patterns may be used to indicate that the unit is unassigned or assigned or items are present or expecting more items or ready for pickup or an item has been placed in error.

A shelf unit can vary in number of sensors and lights, depending on the application needed within a store environment. For example, a shelf unit may have one sensor and one light. For another example, a shelf unit may have multiple sensors and multiple lights.

The color and material of the shelf 400 can vary in different embodiments. The outer surfaces of the shelf are designed to be easily swappable in manufacturing such that the material, color, and finish can be customized to fit the brand of the user.

In some embodiments, one or more modular screens are used and, when placed side by side, may be dynamically joined together to function as one longer screen for larger order sizes. The one or more modular screens may be placed adjacent to one or more shelf units or, alternatively, may be placed over their front displays 410.

4.2.1 Front Display

In some embodiments, the front display 410 of an intelligent shelf 400 is a dynamic digital display. The shelf uses the dynamic digital display to communicate custom messages to guests and store employees including but not limited to:

Customer Name

Order status

An identifier, such as a number, letter, or icon, to identify the shelf

Personalized messages, such as "Happy Birthday" and "Thank You"

Motion lighting displays that are artful and engaging

Branded still images or animations for marketing

Co-branding for delivery or marketing partner(s)

The front display 410 may be implemented as a rear projection module projecting onto a thin diffuser layer. The diffuser layer may be a digitally printed, translucent, in mold decoration film molded onto the clear plastic housing of the shelf 400, or it may be a thin film that is separate from the housing and assembled onto it from the inside or outside.

A secondary lens may be added to the optics module of the projector in order to change the throw distance, aspect ratio, focal length, or distortion of the image. In cases where an extremely short throw distance combined with a wide angle of projection are required, a Fresnel lens (or other thin layer of micro lenses) may be added near the diffuser layer where the image is projected. The purpose would be to turn the light so that it is projected in parallel out of the entire width of the front display 410 so that the brightness of the entire front display 410 is more uniform when viewed from every angle.

4.2.2 Modular Shelf Design

The intelligent shelf may vary in size and is modular and, as such, may be deployed in a number of different scenarios without changing a base electronics module. In some embodiments, the base electronics module may be a small freestanding object, as illustrated in FIG. 4A, that could be placed on a countertop or integrated with another structure. The base electronics module may contain a front display 410, a food presence sensor 415, a light source 420, a locus for receiving battery(ies), a wireless communication chip(s), a power port, and attachment points for various modular structures to be used in different deployment scenarios. More or less components may be part of the base electronics module.

TABLE 1 states an example list of potential components in an intelligent shelf, in one embodiment. It will be apparent, however, that listed components may be replaced with other compatible components.

TABLE 1

Power
    POE+: IEEE 802.3 at (class 4 powered device); 800 watt power sourcing equipment (PSE)
    Battery: Li battery
    Wall power: 12 V, 3 A supply
Optical Package
    Projectors
        Optical engine: FLE2 or FLA8+ from Young Optics
        Digital micromirror device (DMD) from TI - DLP 2000 or DLP 2010
    Application-Specific integrated circuit (ASIC) to control LEDs - DLPC 2607
    Power management IC—DLPA 1000
    High intensity RGB LEDs
    Host processor: Beaglebone Black Wireless + Microcontroller
    Embedded Linux computer running Debian Jesse
Illumination LEDs
    Series of individually addressable RGB LEDs
Food Sensing Technologies
    Mechanical weight sensor—strain gauge or switch
    IR detection: passive IR sensor for optical detection
    Capacitive sensor: Cypress semiconductor PSoC MBR 3 series (CY8CMBR3116)
Shelf Materials
    Process: Injection Molding
    Material: UV-Stabilized LEXAN 104R or similar.
    Second option: VALOX-420HP or VALOX-325FC.
    Finish + diffusion material: MT-11010 mold texture with TABLE 1-continued Digital IMD appliques on LEXAN-8A23D-WH4034X.010 or VALOX-FR1-1001.010. Visual pattern on the applique can be customized to match partner's corporate identity.

Modular accessories can be designed for the electronics module to plug into with a standardized interface. Accessories to the electronics module may be in the form of stackable freestanding shelving, shelving integrated in a wall, landing pads that can be placed on a table or countertop, covers, trays or racks. Accessories to the electronics module may have features that insure square alignment of units. Accessories to the electronics module may have standardized interfaces that may contain power and data connections to the electronics module. In this manner, the electronics modules could be provided with power and data through a corresponding structure that they are mated with. The corresponding structure could then in turn have one power and data connection that serves all connected intelligent shelves. In some embodiments, the shelves may be loaded from any side of the corresponding structure, such as a wall, depending on application within the store environment.

Figure 4D:
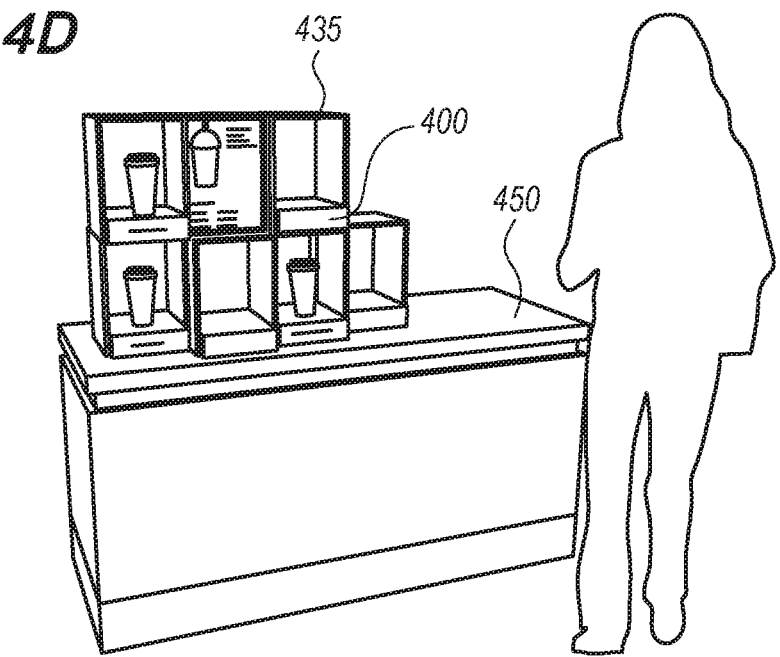

FIG. 4B, FIG. 4C, FIG. 4D illustrate example shelf configurations, in accordance with some embodiments.

FIG. 4B illustrates shelves integrated into a wall. In FIG. 4B, the shelves 400 are arranged in a 3×6 grid, forming eighteen (18) shelf units or receptacles for receiving prepared products. One or more display monitors configured as a status display board 440 relaying information may be placed above the shelves 400. In an embodiment, the shelves 400 are adjustable along a column and sit on low profile pegs 430, as shown in FIG. 4A. The in-use shelves display customer names. In some embodiments, the shelves 400 arranged in a grid may sit within a rack structure like the one shown in FIG. 3D to enable a structure that permit components that can heat or cool the interior above individual shelf using known methods, where the system may need to function in an environment that is outside the standard operating temperature range for the shelves.

FIG. 4C illustrates shelves placed on a countertop. Although the shelves 400 shown in FIG. 4C are spaced apart, the shelves 400 may be positioned together without spacing on the countertop 450. In an embodiment, the shelves 400 may include attachments for coupling and aligning with other shelves 400. In some embodiments, a shelf 400 may have a planar bottom surface sufficiently large enough to provide stability and proper placement of the shelf on the countertop 450.

FIG. 4D illustrates shelves placed on a countertop. The shelves 400 shown in FIG. 4D are stacked using a U-shaped covers 435 that are positioned over the shelves 400. In this manner, a shelf 400 may be placed on top of a cover 435, and the shelves 400 may be arranged in stacked rows on the countertop 450.

4.3 Smart Table

Figure 5A:
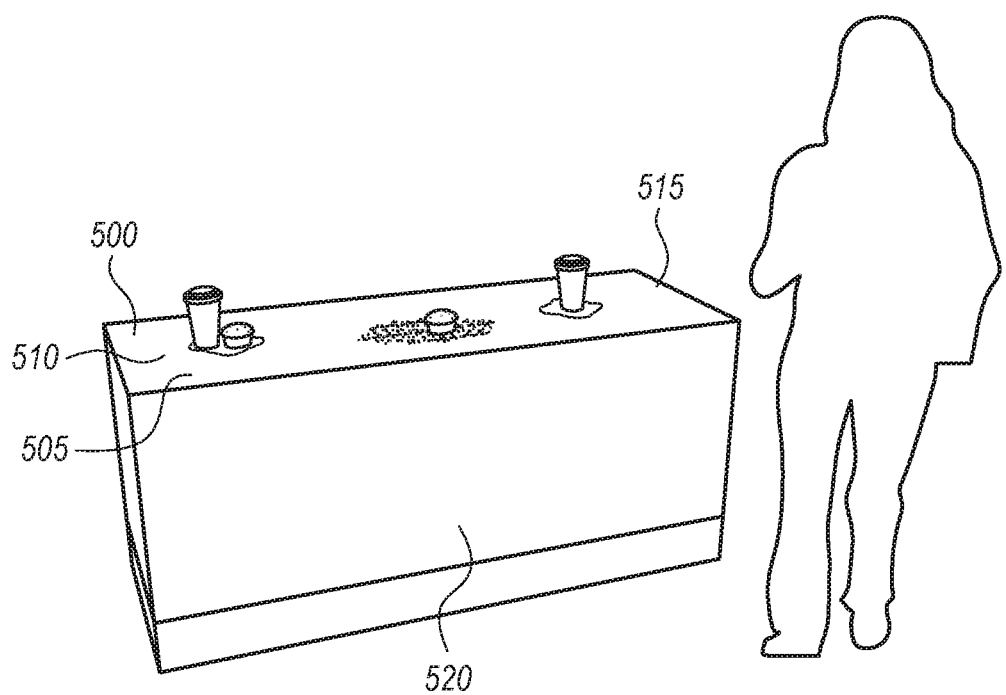
FIG. 5A, FIG. 5B, FIG. 5C illustrate example intelligent surfaces, in accordance with some embodiments.

Smart Table is an intelligent surface that connects dynamic digital content and food items/packaging. FIG. 5A illustrates an example intelligent surface, in accordance with some embodiments. The intelligent surface 500 includes of a sensing system 505, a digital display 510 embedded in a countertop, a protective layer 515 on top of the digital display 510, and a processing system 520 that controls the display 510. The processing system 520 may be located under the countertop or elsewhere within a store environment.

The intelligent surface 500 can sense location and identity of items that have been placed on the countertop and relays information via the digital display 510 back to guests, including but not limited to:

Name

Order status

Personalized messages such as "Happy Birthday" and "Thank You"

Colored shapes

Motion graphics that are artful and engaging

The intelligent surface 500 are responsive to food items/packaging and can track size, location, presence, and identify what order an item is part of Technology used to locate and ID the items may be some combination of, RFID, NFC, a camera with computer vision, barcodes, QR codes, optical character recognition of printed or handwritten text, or manual pairing.

Some sensor modalities, such as NFC or RFID, could be used by embedding the sensor(s) into the protective cover 515 of the screen on the table. Other sensors, such as barcode/QR code readers, optical recognition, or cameras paired with computer vision could identify food items or packaging either from above the table, or from underneath a projecting surface using a combining lens. In either case, the goal of the sensor package is to identify both the identifying number of the food or packaging article and its placement on the screen. This information is then processed on the associated computer 520 and displayed onto the digital surface 500 to visually identify the package to the customer. When an item is placed on the digital surface 500 and identified by the system, the customer may also be notified via an order status display board, their mobile device, or both.

The digital display 510 may have a range of color but can also be monochromatic. Content may have the ability to function in standard definition, high definition and 4K. The display technologies used could be standard television/computer displays as well as DLP projectors. In the case of the DLP projector display, handoff plane may be scaled or formatted to non-rectangular spaces such as rounded or stepped counters.

Figure 5B:
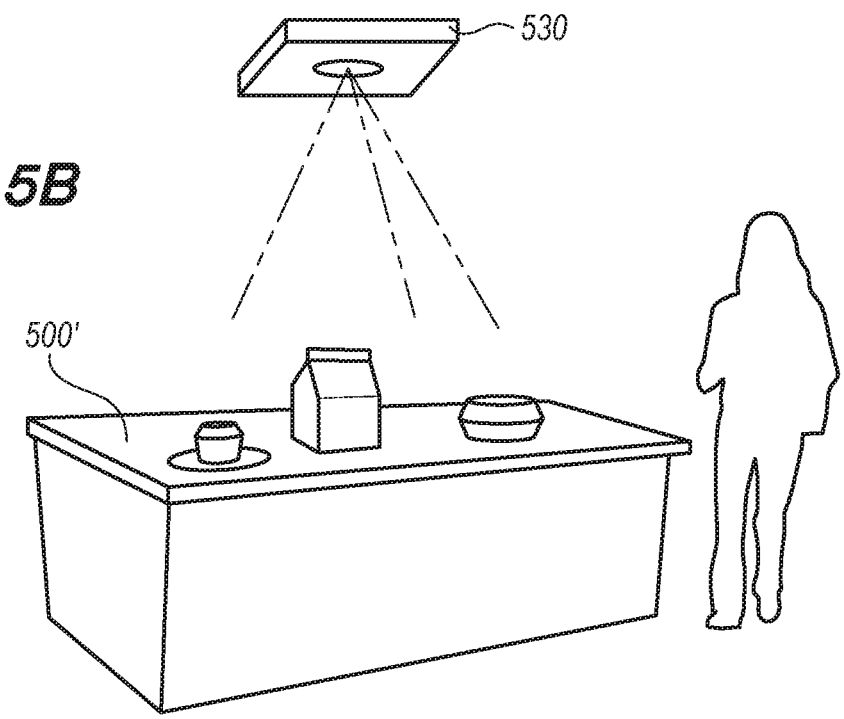

FIG. 5B illustrates another example intelligent surface, in accordance with some embodiments. The intelligent surface 500' of FIG. 5B is similarly configured as the intelligent surface 500, except that the intelligent surface 500' does not have an embedded display. Rather, a projector 530 is used. In an embodiment, the projector 530 is positioned above the countertop and projects digital content downwards onto the countertop. In an embodiment, the projector 530 is communicatively coupled with the processing system 520 to receive information therefrom to display. In some embodiments, the intelligent surface 500' may also lack a protective layer 515 that the intelligent surface 500 has.

Figure 5C:
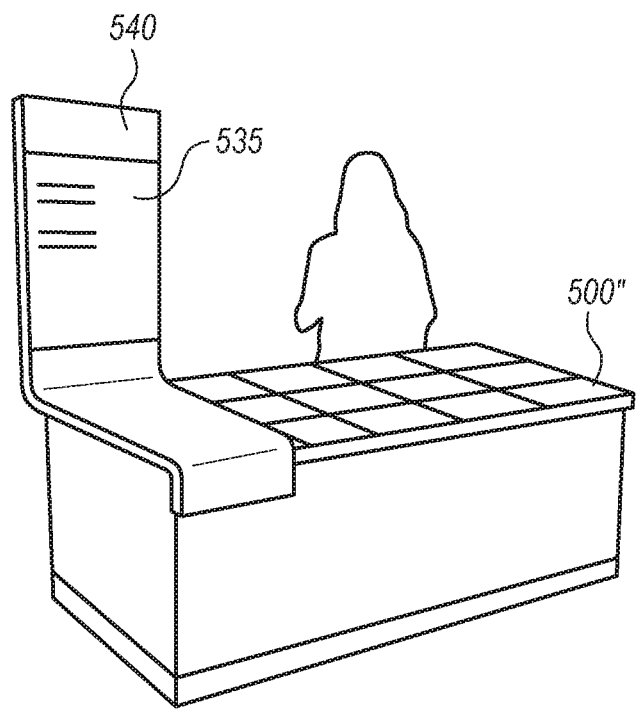

FIG. 5C illustrates yet another example intelligent surface, in accordance with some embodiments. The intelligent surface 500" of FIG. 5C is similarly configured as the intelligent surface 500. In addition, an informational static display or a functional screen may be coupled with the intelligent surface 500" using a L-shaped structure 540 to hold up the information static display or the functional screen 535, which may be used to direct customers to counter location. In some embodiments, the L-shaped structure 540 may made from oriented strand board (OSB) or another lightweight material. The functional screen is communicatively coupled with the other systems of the intelligent surface 500".

The outer shell of the intelligent table may be formed/skinned to fit preferences of various brands.

5.0 ORDER STATUS DISPLAY BOARD

A designated pickup mechanism may have an accompanying order status display, such as an order display board. The order display board may double as a functional screen to provide customers with their order status while also delivering brand messaging.

In one embodiment, an order display board may comprise of one or more digital display monitors mounted on a countertop, free-standing, on a wall, or on a ceiling. In an embodiment, each digital display monitor may measure 1280 px×720 px (in landscape) or 720 px×1280 px (in portrait) or other resolutions. A combination of two or more digital display monitors can be assembled into a status display board, either in landscape orientation or portrait orientation. The order display board 440 illustrated in FIG. 4B includes six (6) digital display monitors 445 combined together in portrait orientation.

Figure 6A:
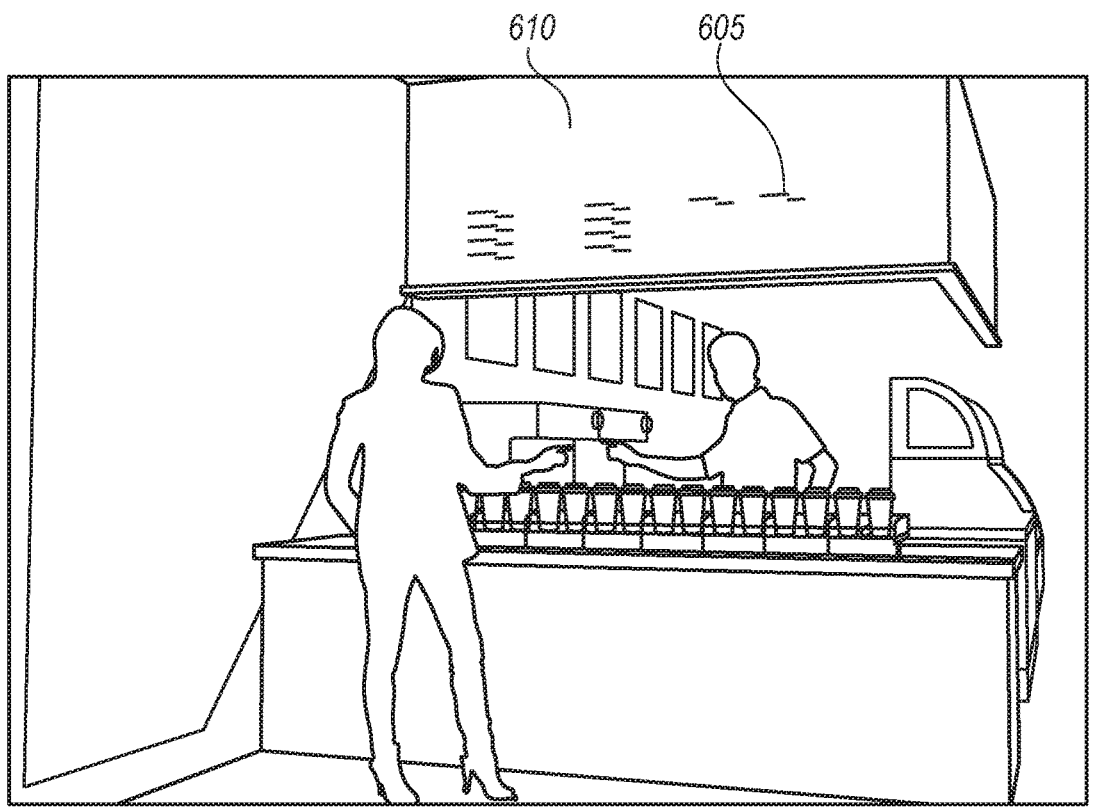
FIG. 6A, FIG. 6B, FIG. 6C, FIG. 6D, FIG. 6E, FIG. 6F, FIG. 6G illustrate example order display boards, in accordance with some embodiments.

In another embodiment, an order status board may use either front projection technology or rear projection technology within a store environment, as illustrated in FIG. 6A. Information (such as customer names and order status) 605 is seamlessly front-projected or rear-projected onto the store interior's physical architecture 610.

Figure 6B:
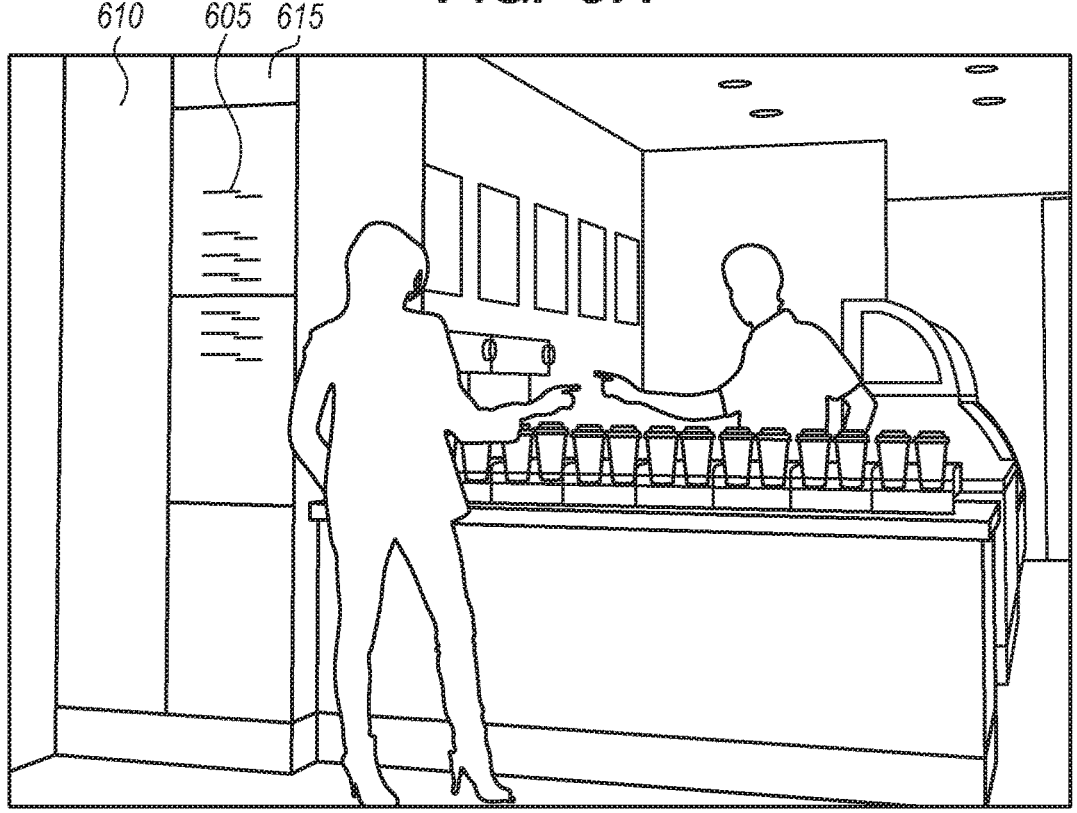

In another embodiment, an order status board could utilize eInk within a store environment or as a fixture, as illustrated in FIG. 6B. Information (such as customer names and order status) 605 is seamlessly integrated into the physical store architecture 610 via one or more eInk panels 615.

Figure 6C:
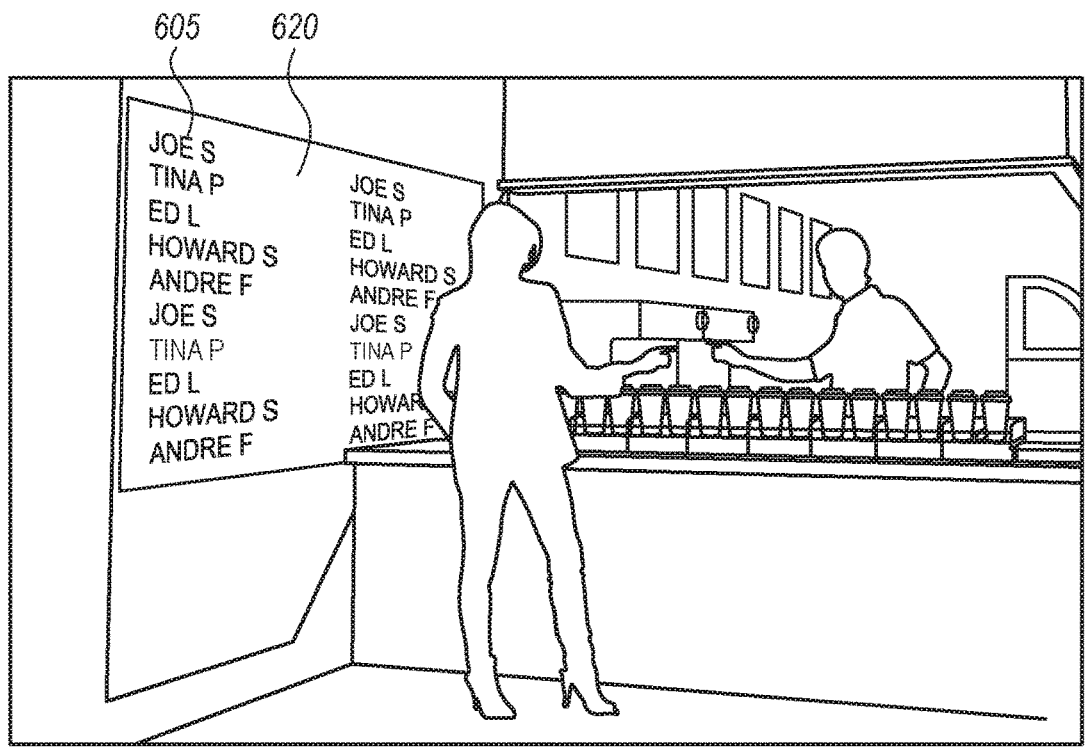

In another embodiment, an order status board could utilize kinetic art within a store environment or as a fixture, as illustrated in FIG. 6C. Information (such as customer names and order status) 605 is displayed on one or more moving mechanical panels or kinetic sculptures 620.

Figure 6D:
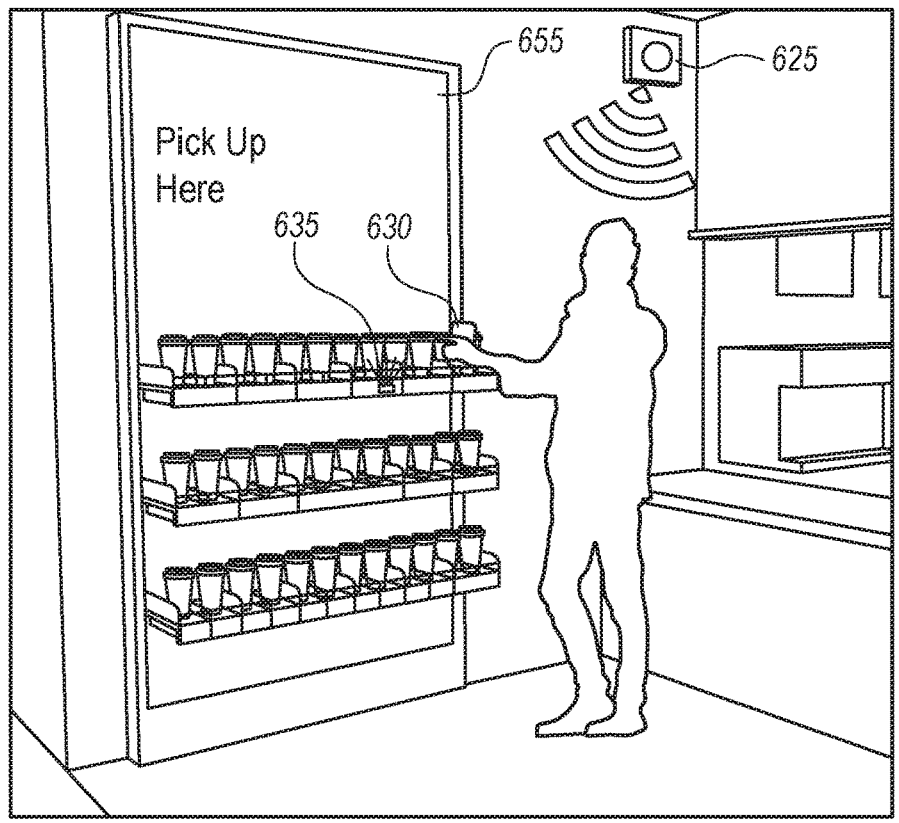

In another embodiment, an individual's handheld device (mobile phone, tablet, computer, etc.) could function as an order status board and communicate with a location sensing and colored wayfinding system, as illustrated in FIG. 6D. The system may include one or more geofencing sensors 625 that sense a customer entering the store and communicates to the customer on the customer's mobile phone 630 if the customer's order is ready. When the customer's order is ready and the customer approaches a pickup wall 655 of, for example, smart shelves, location sensing triggers a colored light 635 on their shelf when the customer is close enough to the pickup wall 655.

Figure 6E:
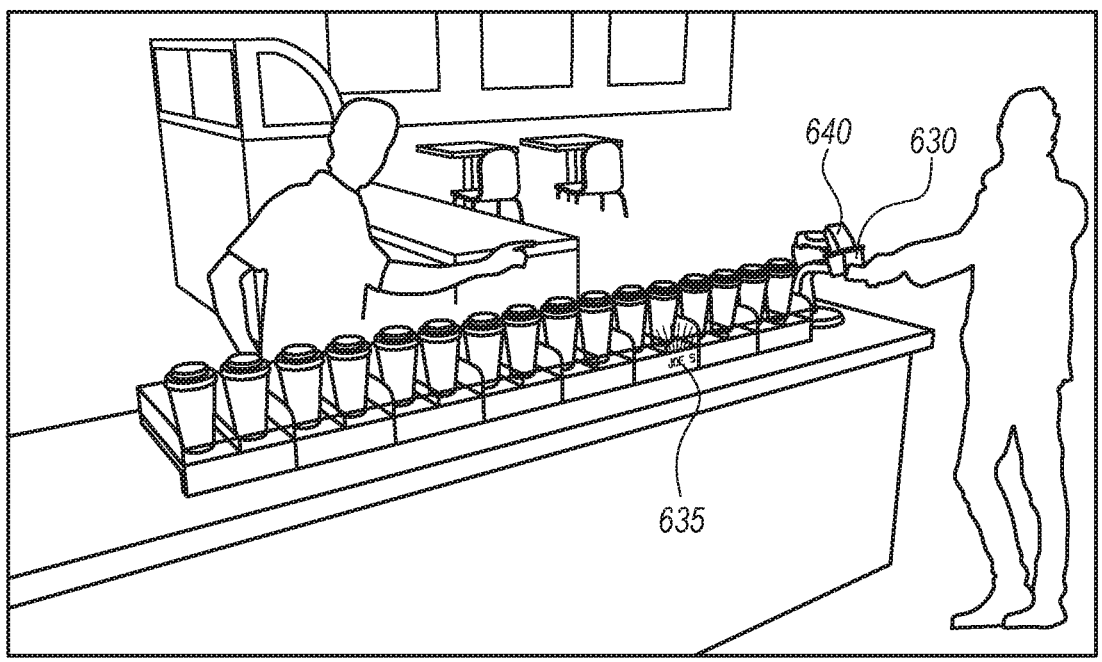

In another embodiment, rather than using a location sensing and colored wayfinding system, a scanner may be used, as illustrated in FIG. 6E. When a customer uses a scanner 640 on the counter to scan a code, such as QR code, in the order placement application on the customer's phone 630, the order placement application triggers a colored light 635 on the customer's shelf guiding the customer to the customer's order for self-service.

In another embodiment, rather than using a location sensing and colored wayfinding system and using a scanner, a customer may utilize sensing technology (such as smart glasses, geofencing, etc.) to make their presence known. For example, an individual could wear smart glasses that utilize facial recognition or geofencing technology to identify the customer, and as the individual approaches a counter of, for example, smart shelves, location sensing triggers a colored light on their shelf when they are close enough.

Figure 6F:
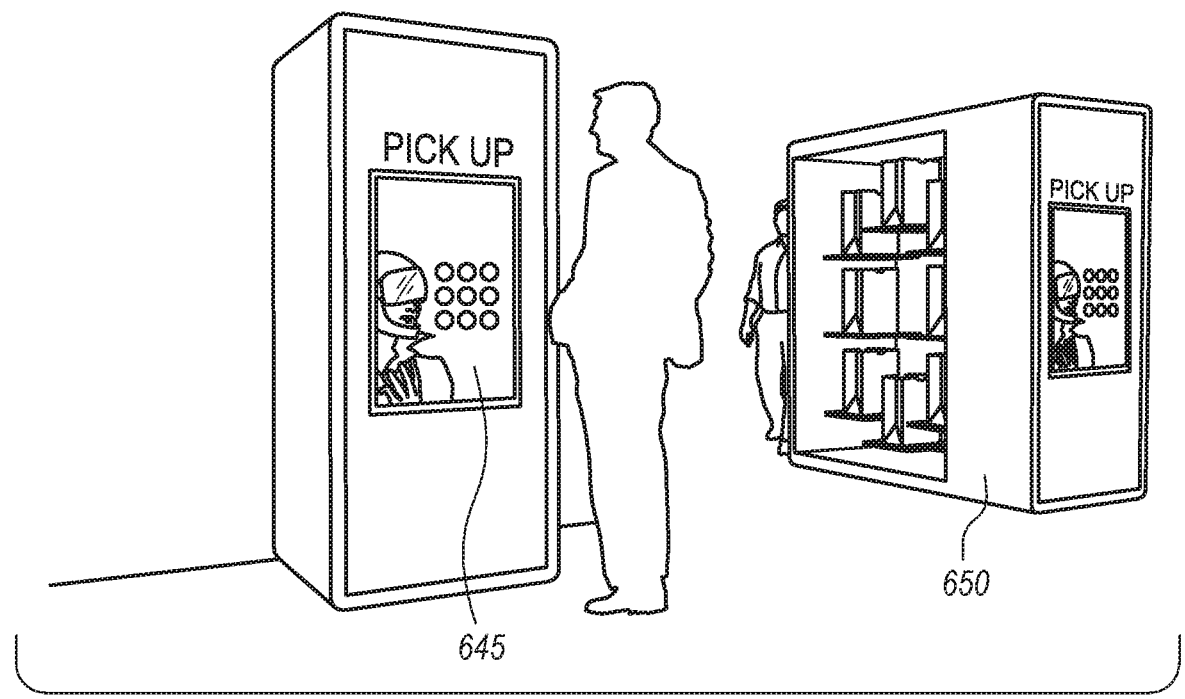

Alternatively, a customer may access the order placement application displayed on an order status board that is integrated with an intelligent shelf system, as illustrated in FIG. 6F. FIG. 6F shows two intelligent shelf systems 650, each integrating with an order status board 645 on its side. The customer may sign in with their phone number or a code identifying their order. As discussed above, meals may be temperature controlled for quality. In an embodiment, the intelligent shelf system 650 may include a belt system configured to rotate meals for easier access and retrieval from the front of the intelligent shelf system 650. In an embodiment, a store employee loads the meals from the back of the intelligent shelf system 650.

Figure 6G:
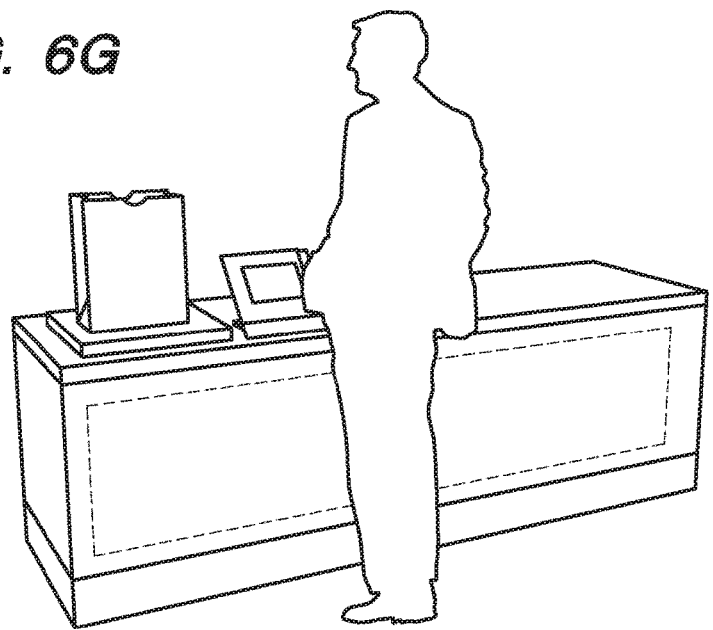

In another embodiment, a sign in kiosk (tablet, computer, etc.) could function as an order status board. The sign in kiosk may be positioned on or beside a carryout counter. The carryout counter may include one or more automated units to reveal carryout meals. Only one automated unit is shown in FIG. 6G. The one or more automated units are coupled with a belt system located within the counter. The belt system is configured to lift an automated unit from below the counter at one of one or more designated locations to above the counter to reveal a meal identified by the customer. After the carryout bag, including the meal, is retrieved or removed from the automated unit, the automated unit is lowered, and the carryout counter is ready to reveal another meal. In an embodiment, the belt system extends from a back of house area, where a store employee loads carryout meals on the one or more automated units. In another embodiment, a store employee loads carryout meals from the back of the carryout counter.

An order display board may be either within reach of customers or out of reach. The order display board may be interactive with the customer in order to help them find their order quickly and efficiently. For example, a customer may select their name from a list and trigger an intelligent shelf with their order on it to light up, flash their name, or otherwise notify them of the location of their order. The order display board might include customer names, order numbers, expected order completion times, order preparation progress, location of completed orders, marketing, loyalty, brand related material, or other material that can be displayed on a digital screen. The order display board may also be used to communicate any information that provides order status (for example, communicates whether or not an order is ready), wayfinding (for example, whether to find a completed order), or validation (for example, confirmation that an order has been received and is being prepared).

In an embodiment, units (cubby units, shelf units, etc.) may be paired with the order display board that react dynamically to the units by displaying static or motion graphics and communicating messages to guests and store employees including but not limited to:
  Name
  Order status
  A number/letter/icon to locate the shelf
  Personalized messages such as "Happy Birthday" and "Thank You"
  Motion lighting displays that are artful and engaging
  Co-branding for delivery or marketing partner(s)

Benefits of the status display board include displaying customer name and order status, thereby providing visibility into the order queue, providing a marketing opportunity to showcase the brand, promotions, and new menu items, configuring digital content, which is remotely deployed and instantly updated in-store, eliminating costs of printing and shipping printed marketing material, and providing unique customer experience with enticing graphics.

6.0 CLIENT DISPLAY SERVER

Content to be displayed may be supplied by an in-store web server such as a Client Display Server (CDS). The CDS is lightweight and may run on NodeJS and ExpressJS. Each display (including the shelf, cubby, display board, menu screen, etc.) in a store may be referenced as distinct URL addresses. For instance, to render the display content of Shelf 14, the reference may be http://<server-address>/shelf/14.

The CDS will render a basic layout of HTML/CSS/Javascript for a given display type. For example, for a shelf, the name of the customer and number and personalized messages may be statically positioned with CSS. The state of the shelf display may be driven by web socket messages. These messages may contain information in JSON that will indicate to the shelf whether an order is assigned to it, whether the order is ready, and if the customer has taken the order. For each of these states, an animation may play. The animation may be in the form of an H.264 compressed mp4 video file or MOV, AVI, MKV, 3GP, WebM, WMV, FLV, or another equivalent-type video file. The entire display (name, number, video) will be rendered backwards, as the projector within the shelf is projecting outward, behind the viewable area.

In an embodiment, the videos that display, such as on the shelf, appear to be fluid, but are actually split into several videos. Some of the basic states are "assignment transition," "assignment loop," "order ready transition," "order ready loop," and "thank you." Other states may be added via configuration. When a transition occurs, the CDS code will make sure a looping video has finished its loop before playing the next video. This enables asynchronous timing of order pickup. As each video ends, the "ended" digital order management system event will trigger code to hide the current video, show the next one, and then play it. This transition occurs so quickly that the videos appear to be as one single continuous video.

Another video feature is the ability to display images or animations across multiple shelves in a coordinated fashion. This may be configured in a cloud service and web application (Provisioner) as an "Cross Shelf Animation (CSA)" or "Cross Cubby Animation (CCA)" for cubbies. The CSA/CCA information may include which shelf the animations should play on (using the name or number of the shelf such as 1, 2, 3, 4) and at what time delay after the animation has begun. For each shelf, a series of animations will then play at designated timing offsets to simulate a cohesive animated experience across multiple devices with independent displays.

The video content and configuration options are stored in AWS in an S3 bucket. The configuration may be formatted as a JSON file and contain the metadata necessary for the display web application to know how many screens to host, what size and orientation they are, and if there are any general settings to override defaults defined in CDS.

The displays defined in the configuration may reference assets associated with them. The assets may include images, fonts and videos, and may be stored in an assets directory in the same AWS S3 bucket.

The Provisioner manages the JSON and assets. The metadata and management are stored in an SQL database. A user wanting to modify the videos and content that is displayed on a shelf or similar store screen may make changes to the modeled data in the cloud service, upload files to the AWS S3 bucket, and when ready, the user may initiate an action that will serialize the store metadata into a JSON file and then copy it to the AWS S3 bucket. The uploaded files may be given a file name equivalent to their calculated MD5 hash to prevent duplicate filename collisions.

The CDS checks the S3 bucket JSON config every 10 seconds or at some other frequency. When it detects a change (by diffing the content), it will download the new config file, parse it, and see if there are any new assets and compare to the local cache stored on the in-store server. Once downloaded, the CDS will inform all displays (shelf/cubby/status screen/menu screen/etc.) of the update by sending a web socket message. The shelf will check to see if an order is currently in progress on it, and only update its videos and appearance once it has been delivered, otherwise it will update its display to match the new configuration and associated videos/images.

The Provisioner may work within a local network and be configurable from a designated device. In an embodiment, instead of using an AWS S3 bucket, the Provisioner may store assets locally within the network.

7.0 OPERATION AND OTHER CONTROLS

A unit, such as a cubby unit or a shelf unit, is flexible to a variety of workflows operators use. An operator, such as a store employee, may be told which unit or units to put an order in/on, or the operator may pick any open unit. A designated pickup system or the operator may assign the target unit as soon as an order is placed, when the order is about to be made, after the order is made, or just before being placed in/on a unit. The system may assign a landing zone (for example, a designated portion of units) on a per-item basis, or it may assign a landing zone on a per-order basis. The system may allow incomplete orders to be given to customers or may require an order to be completed before it is delivered. The operator may specify specific landing zones for certain order types, such as for large orders or single item orders. The operator may specify landing zones for specific order channels, such as for mobile orders, or kiosk orders, or third party delivery services.

A designated pickup system may support multiple service models. The operator may be responsible for retrieving an order and giving it to a customer, or customers may be instructed to pick up orders themselves. The behavior of the lights, sensors, front display images, accompanying status board behavior, notifications to users, or user facing software may change based on the service model type. This may be set on a store level, may be configurable for different times of the day, or may be changeable on-the-fly.

In each service model, an order status display board and/or other components of a designated pickup system are modified for the purpose. For example, the surface of an intelligent shelf may display specific colors such as red and green in a customer facing model when an order is still in process and then complete and ready for pickup, respectively. That same shelf could be configured for an employee-centric service model when the shelf system is green when available for use, yellow when an order is in process but not complete, red when an order has a problem, and blank when an order is complete. The colors could be modified to identify how long an order has been sitting in or on a unit or a small time or hour-glass image might be used. The status board in the customer-facing model might display the name of the customer and some other info regarding the customer, the status of the order, the location of unit that the order will be in or on, when the order is complete, or some combination thereof. The order status display board in the employee-centric model might display the name of the customer and some other information regarding the customer, the status of the order, but not the location of the unit.

A designated pickup system may also use various components for order processing and unit assignment, which might include scanning a bar code on the label of an order, utilizing OCR technology to identify an order and customer, or similar means to read information about a customer to assign a specific shelf to that order.

A designated pickup system may also use voice recognition technology to assign a unit, release a unit, or initiate some action in relation to one or more orders or the designated pickup system. For example, when an employee is moving an order to a shelf, the employee may state "order for Christopher assigned to Shelf 4" and the shelf would display the customer's name (Christopher) and any related information in the system on Shelf 4 and the status board. Similarly, when a customer picks up an order, or an employee provides an order from a shelf to a customer, voice recognition could be used to clear that shelf in the shelf system or take some other action in relation to the shelf or the shelf system.

In some embodiment, a designated pickup system may interact with the GPS, Bluetooth, Near-Field Communication (NFC) or similar location technology in a customer's phone or mobile device ("Customer Location Technology"). The designated pickup system may utilize a Bluetooth zone system, which includes one or more receivers on one or more units to interact with the Customer Location Technology and may corresponds to a location of a particular store, the designated pickup system or individual unit. The Bluetooth zone system may be configured to allow a customer to take specific actions in relation to the designated pickup system based on authorization rights related to that customer.

A designated pickup system may have a configurable setting that times how long an order has been placed in/on a unit. This setting may be used for food quality, freshness, or safety. The designated pickup system may tell the operator to remove an item if it has exceeded this threshold.

In some embodiments, a unit may include an input device to receive information from a user. In some embodiments, a cubby or shelf includes some identification for security, marketing, or other purpose. This could include mechanisms such as a key code or a biometric recognition mechanism (for example, a facial recognition mechanism, or a finger print recognition mechanism, or a palm print recognition mechanism, or an iris recognition mechanism, or a combination thereof).

In some embodiments, a unit may include a software module configured to recognize arrival of an individual. The recognizing the arrival of the individual may use a biometric recognition mechanism.

Each unit may be flexible in terms of size. For example, an intelligent shelf can be sized accordingly to the typical product that will be used with the shelf. This can be accomplished through several different ways. The individual shelf could be size specifically for the applicable product. Alternatively, the shelf could be sized to a standard size or the size of the largest potential product that might be used with shelf and then that individual shelf would be partitioned into much smaller shelves. For example, one 8"×12" in shelf could be partitioned into 6 smaller shelves that were 4"×4" in size. This partition could be made possible by simply making showing gridlines on the surfaces of the shelf using the display technology within the shelf (either displayed from within the shelf or via projection from a location exterior to the shelf (such as when multiple levels of shelves are stacked) or a combination of both. Alternatively, it could be actually hardware that is built directly into the surface of the shelf or that sits independently on top of the shelf. The shelf system could also be a combination of these example such that when a clear or acrylic hardware piece of hardware is used to divide a single shelf into multiple smaller shelves, the display or projection makes specific sections of the subdivided shelves more noticeable by lighting the edges of the subdivisions.

In some embodiments, a unit comprises a temperature controller. The temperature controller may include a heating apparatus, a cooling apparatus, or both. In some embodiments, the temperature controller maintains the interior of a cubby and the surface of a shelf or its surrounding area in a temperature based on a type of the product (for example, ice cream is to be kept cold, pizza is to be kept hot) maintain better food quality. The unit can be used in many different user flows, some of which require food to be kept on, in or around the unit for a long period of time and necessitate the temperature control of the food to maintain quality.

Different methods of providing temperature-controlled air to a designated pickup system may be used. For example, air could be pumped to each unit from a distant source of temperature-controlled air. Example sources include a heater, an air conditioning unit, a Peltier cooling system, or any other apparatus that can be used to control the temperature of air. In one embodiment, the working fluid of the temperature control system may be water or a water/glycol mixture. In one embodiment, the heat added or removed to each unit may be through either a passive or active heat exchanger. In one embodiment, a heat source or heat sink may be placed locally to each unit rather than at a distance, and directly affect the temperature of each individual unit.

Depending on the configuration and placement of the temperature control actuators (either heating or cooling; remote or local), a designated pickup system can be insulated in several different ways. It is important to insulate the designated pickup system when temperature controlled to improve the temperature controllability of the system and to reduce the energy usage of the system. At a macro level, the designated pickup system can be insulated as a whole, with the temperature of the interstitial space at equilibrium with that of the units. In another embodiment, the units can be individually insulated, with insulation in the interstitial spaces between units. For example, the interior of each cubby is at a different temperature than the interstitial spaces between cubbies. The interstitial insulation can be any insulation commonly used in industry, for example fiberglass insulation, foam insulation, vacuum panel insulation, or any other commonly used insulation.

In some embodiments, there may be specific subsystems of a designated pickup system that need particular attention in order to function in an environment that is outside the standard operating temperature range for that subsystem. Particularly, some electrical components, screen components, lubricants, drive systems, and plastic components may require special attention. These subsystems can be replaced with similar systems with a more appropriate operating temperature range, or they may be protected from the environment in a variety of ways. In some embodiments, these systems are protected by double-paned glass or plastic insulation (to maintain the visual clarity of the screen subsystem). In other embodiments the systems are protected by active cooling, such as film cooling or forced convective or advective cooling, in some cases paired with a heatsink or heat pipe to help transfer heat out of a component. Individual electronic components or electrical systems may be protected by local insulation, such as potting compounds, or may be protected by active or passive heatsink cooling.

In some embodiments, a designated pickup mechanism uses various heated, insulated bag technologies to keep food at a particular temperature. In one embodiment, a foil insulated delivery bag combined with active, battery powered heating elements might be used. In one embodiment, the battery-powered, heated bag is location aware and integrates with other system components via various communications means. In one embodiment, the battery is removable. In one embodiment, the battery is chargeable, such as by induction charging or other equivalent means. In another embodiment, there is no battery and the heating element is powered by a fixed AC or DC power supply.

In some embodiments, a designated pickup mechanism utilizes induction charging to charge the bag. In one embodiment, the bag can be tracked by RFID, QR, or similar means. The surface of a designated pickup mechanism could use a RFID sensor or an app that scans an optical code. In one embodiment, there are temperature probes inside bag that log temperature data during delivery and download when the bag is returned to or within range of a particular system component. In one embodiment, the bag could use instrumented zippers (contact sensors) to know when the order was zipped up (completed) or unzipped (delivered). In one embodiment, cameras/scanners could take the place of RFID.

Heated, insulated bag technologies could be used in any implementations that require that the food be kept at or near a certain temperature. In one embodiment, heated, insulated bag technologies are used to enable food delivery services. For example, an expo worker in a dark kitchen could assemble a completed order, grab a battery powered, temperature controlled, location aware bag from the bin, and slide a charged battery into the base of the bag. The expo worker could then set the bag on their expo station, where an under-table-mounted RFID reader identifies the bag and associates it with the order that is being packed. When the order is completed and marked complete in a software module configured to provide a restaurant staff with guidance for preparing the meal order ("OpsMan"), the expo is given a location to place the bag for pickup. For example, the expo worker turns and places the bag in "Bin #3" as instructed. Bin #3 is also equipped with an RFID reader and marks the order as ready-to-pickup in OpsMan and notifies a delivery driver that the order is ready and displays the order to pick up on a status board.

Bin #3 recognizes when the order is retrieved by the driver and tracked via the driver's phone's GPS to customer address. The driver scans the bag (QR code or similar) at customer's address to mark the order as delivered. Bags are returned to the dark kitchen upon driver return, and an external battery indicator alerts staff to charge/swap the battery if necessary.

In another embodiment, a heated, trackable bag might be utilized as part of a subscription service. Heated bags would be delivered by drivers (during down time/after-hours/before hours) to start a restaurant's night with the minimum of bags subscribed. Drivers would be incentivized to charge bags overnight and would be routed to drop off bags at restaurants in need the next day. Drivers that have bags after a delivery may be routed to a restaurant that needs bags mid-day (or mid-service) as needed. Bags are tracked by QR code, barcode, or any equivalent service that can be read by a mobile computing device (smartphone, tablet, etc.).

A restaurant completes an order by marking it complete on their OpsMan tablet and scanning the tracking code to identify the bag. The delivery driver, when he/she arrives, scans the bag to confirm pickup (and pickup of the correct order) and scans again at customer address to mark delivery of correct order.

In some embodiments, each of these methods of temperature control, insulation, and protection can be combined with each other or used independently in many different ways to achieve a similar result.

In some embodiments, a designated pickup system may be integrated with Point of Sale (POS), or Kitchen Display System (KDS) software, mobile or web ordering applications, or another software system.

8.0 EXAMPLE LAYOUT CONFIGURATIONS

FIG. 7A, FIG. 7B, FIG. 7C, FIG. 7D illustrate example layout configurations of a pickup site, in accordance with some embodiments.

Figure 7A:
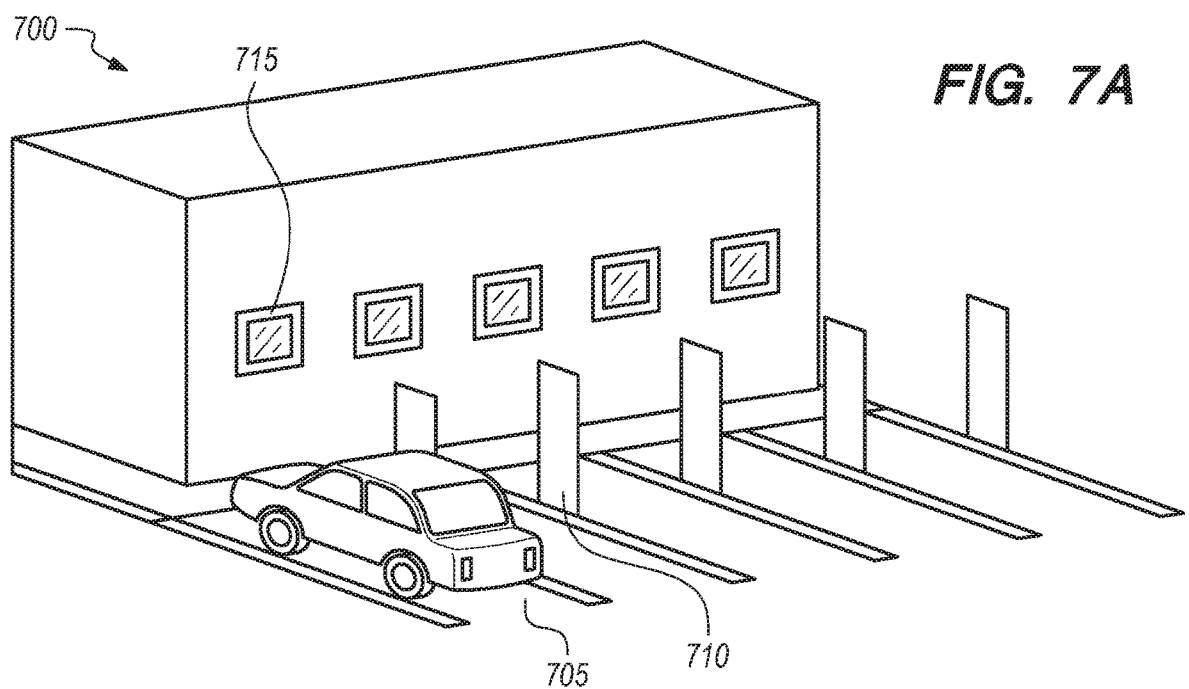
FIG. 7A, FIG. 7B, FIG. 7C, FIG. 7D illustrate example layout configurations of a pickup site, in accordance with some embodiments.

FIG. 7A illustrates a drive up singular point of pickup and order at a pickup site. The configuration 700 shown in FIG. 7A includes five (5) separate drive up slots 705. Each drive up slot includes a kiosk 710, such as the kiosk 200 of FIG. 2, and a cubby 715, such as the cubby 330 of FIG. 3B, inset into an exterior of a building infrastructure. After a customer drives up into a slot 705, places an order at a kiosk 710, the customer waits for the meal to be prepared. Once the meal is prepared, a store employee loads the meal from the back of a cubby 715 associated with the slot 705.

FIG. 7B, FIG. 7C, FIG. 7D, FIG. 7E, FIG. 7F illustrate different interior space configuration of a pickup site.

Figure 7B:
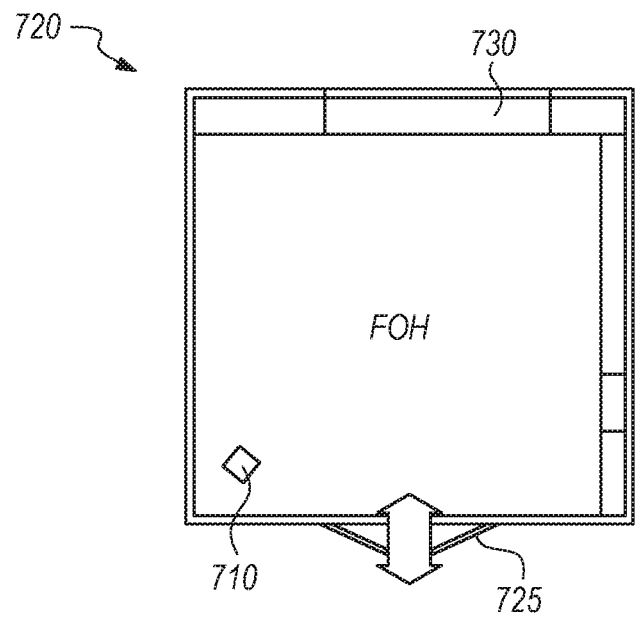

In one embodiment, shown in FIG. 7B, the configuration 720 of at least a portion of an interior space of a pickup site includes a kiosk 710, located near a front entrance 725 of the pickup site. However, more than one kiosk 710 may be used and may be positioned at different areas of the interior space. A Cubby Wall 730, such as the Cubby Wall 350 of FIG. 3C, is located at and against the back of the pickup site. In this embodiment, prepared products are front-loaded. Customers are able to see prepared products loaded. There are more front of house space, which may be utilized as a dining area or a waiting area. In an embodiment, the Cubby Wall 730 is temperature controlled using one or more of the methods described above.

Figure 7C:
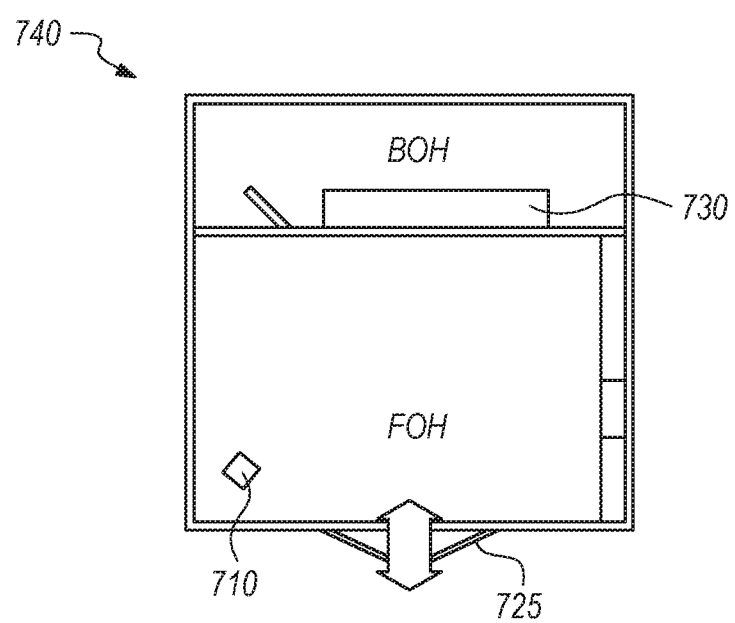

In an embodiment, shown in FIG. 7C, the configuration 740 differs from the configuration 720 of FIG. 7B in that the Cubby Wall 730 separates this portion of the interior space into a front of house area and a back of house area. The back of house area is sufficiently large enough for a store employee to load prepared products into the Cubby Wall 730 from the back and/or side rather than from the front as in the configuration 700.

Figure 7D:
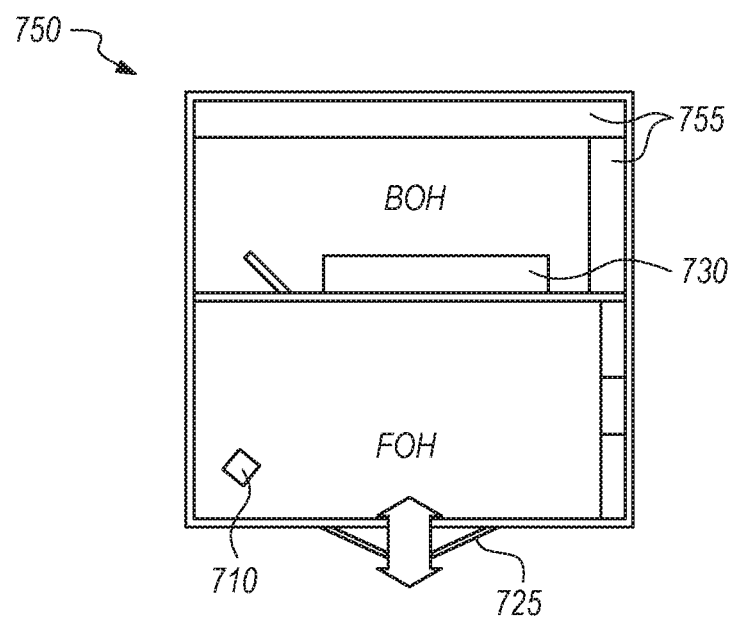

In an embodiment, shown in FIG. 7D, the configuration 750 differs from the configuration 740 of FIG. 7C in the back of house area is larger, which may be configured as an inventory space. Work surfaces 755 may be along different sides of the back of house area. A larger inventory space allows for more time between deliveries and fewer cubbies required per throughout. Prepared meals may be manually loaded or automatically loaded from the back and/or side rather than from the front as in the configuration 700. In some embodiments, meals may be cooked to order as they may be prepared in the inventory space. In some embodiments, the inventory space may include a venting system.

9.0 PROCEDURAL OVERVIEW

FIG. 8 illustrates an example method, in accordance with some embodiments. Method 800 includes operations, functions, and/or actions as illustrated by blocks 805-815. For purposes of illustrating a clear example, the method of FIG. 8 is described herein with reference to execution using certain elements of FIG. 1; however, FIG. 8 may be implemented in other embodiments using computing devices, programs or other computing elements different than those of FIG. 1. Further, although the blocks 805-815 are illustrated in order, the blocks may also be performed in parallel, and/or in a different order than described herein. The method 800 may also include additional or fewer blocks, as needed or desired. For example, the blocks 805-815 can be combined into fewer blocks, divided into additional blocks, and/or removed based upon a desired implementation.

FIG. 8 may be implemented using one or more computer programs or other software elements organized as sequences of instructions stored on computer-readable storage media. FIG. 8 is described at the same level of detail as ordinarily used by persons of skill in the computing arts to communicate among one another about the functional steps to be realized in computer programs that may include far more methods, objects, subroutines, or instructions than specifically indicated in FIG. 8. The development, deployment, testing and debugging of functional programs is deemed to be within the high level of skill in the art to which this disclosure pertains.

The method 800 begins at step 805, in which an order preparation completion data is received over a communications network. The order completion data relates to a product(s) that has been prepared in accordance with an order request. The prepared product may be a prepared meal. In some embodiments, the order preparation completion data includes a customer name of the customer who placed the order request.

At step 810, an available unit of a designated pickup mechanism at a pickup site is identified. The designated pickup mechanism at the pickup site may be a Cubby Wall or a variant thereof, an intelligent shelf system or smart table. A unit is a cubby, an intelligent shelf, or a specific counter location on a smart surface. In some embodiments, the available unit is identified at the time of the order request. In some embodiments, the available unit is identified during the preparation of the product. In some embodiments, the available unit is identified after the product has been prepared.

At step 815, a first indicator is displayed on the identified unit when presence sensors sense the product is in or on the identified unit. In some embodiments, the first indicator relays information to the customer that the product in or on the identified unit is for that customer. For example, the customer name is displayed on the identified unit. The presence sensors may be dedicated sensors specifically for the identified unit or may be shared sensors for the entire designated pickup mechanism.

At step 820, the first indicator is no longer displayed when the presence sensors do not sense any content in or on the identified unit. In some embodiments, a second indicator is displayed when the presence sensors do not sense any content in or on the identified unit. The second indictor may include a dynamic brand graphic. In some embodiments, data regarding the availability of the unit is transmitted over the communications network so that the unit can be used again.

In some embodiments, the designated pickup mechanism may have an accompanying order status display, which may double as a functional screen to provide customers with their order status. In some embodiments, the first indicator is displayed simultaneously on the identified unit and the order status display. When the prepared product is removed from the identified unit, the first indicator is no longer displayed on the identified unit and the order status display.

10.0 IMPLEMENTATION EXAMPLE—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (for example, x) and a second axis (for example, y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated service digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

11.0 OTHER ASPECTS OF DISCLOSURE

In the foregoing specification, embodiments of the invention have been described with reference to numerous specific details that may vary from implementation to implementation. Thus, the sole and exclusive indicator of what is the invention and, is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. An intelligent shelf comprising:
a top platform having a substantially horizontal face, a front edge, and a back edge;
a front surface sharing the front edge with the top platform, the front surface having a substantially vertical face and extending downward from the front edge;
an electronics module including:
one or more sensors for sensing presence of content on the top platform;
a wireless communication chip for enabling data communication over a network;
a display screen, coupled to the front surface, for displaying dynamic messages based on the data communication and the sensing, wherein the display screen is configured to go blank when the intelligent shelf is assigned to a particular order.

2. The intelligent shelf of claim 1, wherein the electronics module further includes a light source for illuminating the top platform.

3. The intelligent shelf of claim 1, wherein the electronics module further includes a locus for receiving a battery.

4. The intelligent shelf of claim 1, wherein the one or more sensors comprise one or more of a mechanical weight sensor, a capacitive sensor, an ultrasonic range sensor, an infrared (IR) range sensor, a break-beam sensor or a LIDAR sensor.

5. The intelligent shelf of claim 1, wherein the dynamic messages include an identifier of a customer associated with the content on the top platform.

6. The intelligent shelf of claim 1, the display screen comprising a rear projection module arranged to project onto a diffuser layer.

7. The intelligent shelf of claim 1, wherein the intelligent shelf is integrated into a wall or a countertop.

8. The intelligent shelf of claim 1, further comprising a host processor coupled to the wireless communication chip, the display screen and the one or more sensors, the host processor being programmed to receive order data and shelf assignment data to (1) respond to signals from the one or more sensors in response to the one or more sensors detecting a presence of the content on the intelligent shelf and (2) drive the display screen to display a name or an order number of a customer associated with an order for the content.

9. The intelligent shelf of claim 8, the host processor being further programmed to sense that the content has been taken after pickup and, in response, to communicate via the wireless communication chip that the intelligent shelf is empty and ready for another order.

10. The intelligent shelf of claim 8, the electronics module further including a light source for illuminating the top platform, the host processor being further programmed to drive the light source to accentuate food items on the intelligent shelf using any of a specific color or a visual pattern.

11. The intelligent shelf of claim 8, the host processor being further programmed to drive the display screen to display, an order status, a shelf identifier, or a personalized message, based on the order data.

12. A system for managing product orders, comprising:
a plurality of intelligent shelves, wherein each of the plurality of intelligent shelves comprises (1) a base electronics module configured to showcase a product to a designated recipient, (2) a top platform having a substantially horizontal face, a front edge, and a back edge and (3) a front surface sharing the front edge with the top platform, the front surface having a substantially vertical face and extending downward from the front edge, the base electronics module comprising a display screen coupled to the front surface of the intelligent shelf, wherein the display screen associated with the base electronics module is configured to go blank when the intelligent shelf is assigned to a particular order;
a plurality of modular accessories comprising:
a power interface for providing power connections to the base electronics modules of the plurality of intelligent shelves;
a data interface for providing data connections to the base electronics modules of the plurality of intelligent shelves;
one or more sensors configured to monitor presence of products on top surfaces of the plurality of intelligent shelves.

13. The system of claim 12, wherein each of the base electronics modules comprises a light source for illuminating a top surface of a respective intelligent shelf.

14. The system of claim 12, wherein the one or more sensors comprise one or more of a mechanical weight sensor, a capacitive sensor, an ultrasonic range sensor, an infrared (IR) range sensor, a break-beam sensor or a LIDAR sensor.

15. The system of claim 12, wherein the plurality of intelligent shelves are paired with an order status display board configured as a functional screen.

16. The system of claim 12, wherein the display screen associated with each of the base electronics modules is configured to display dynamic messages based on at least the monitoring.

17. The system of claim 16, wherein the display screen associated with each of the base electronics modules is configured to display a first message when the one or more sensors detect that the respective intelligent shelf is empty.

18. The system of claim 16, wherein the display screen associated with each of the base electronics modules is configured to display a second message when the respective intelligent shelf is assigned to a particular order.

19. The system of claim 16, wherein multimedia content is displayed across the display screens of the plurality of intelligent shelves in a coordinated fashion.

20. A method of managing product orders, comprising:
receiving, over a communications network, an order preparation completion data that is assigned to a shelf;
in response to receiving the order preparation completion data that is assigned to the shelf, causing a display screen of the shelf to go blank;
using one or more sensors, detecting presence of a product on a top surface of a shelf, the top surface having a substantially horizontal face, a front edge, and a back edge;
in response to detecting presence of the product on the top surface of the shelf, using a display screen of the shelf to display a first message based on the order preparation completion data, the display screen being coupled to a front surface of the shelf, the front surface having a substantially vertical face, sharing the front edge with the top surface, and extending downward from the front edge;
using the one or more sensors, detecting that the shelf is empty;

in response to detecting that the shelf is empty, using the display screen of the shelf to display a second message that is different from the first message.

21. The method of claim 20, wherein the order preparation completion data relates to the product.

22. The method of claim 20, wherein the first message includes a name of a customer, and the second message includes a dynamic brand graphic.

23. The method of claim 20, further comprising, in response to detecting presence of the product on the top surface of the shelf, using a light source to illuminate light towards the top surface of the shelf.

24. The method of claim 20, further comprising, in response to detecting that the shelf is empty, transmitting, over the communications network, data regarding an availability of the shelf.

\* \* \* \* \*